US010674066B2

(12) United States Patent
Yoon et al.

(10) Patent No.: US 10,674,066 B2
(45) Date of Patent: Jun. 2, 2020

(54) METHOD FOR PROCESSING IMAGE AND ELECTRONIC APPARATUS THEREFOR

(71) Applicant: Samsung Electronics Co., Ltd., Suwon-si, Gyeonggi-do (KR)

(72) Inventors: Young-Kwon Yoon, Seoul (KR); Jin-Hee Na, Seoul (KR); Hwa-Yong Kang, Suwon-si (KR); Moon-Soo Kim, Seoul (KR); Tae-Ho Kim, Cheongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 15/119,994

(22) PCT Filed: Dec. 4, 2014

(86) PCT No.: PCT/KR2014/011798
§ 371 (c)(1),
(2) Date: Aug. 18, 2016

(87) PCT Pub. No.: WO2015/126044
PCT Pub. Date: Aug. 27, 2015

(65) Prior Publication Data
US 2017/0070664 A1 Mar. 9, 2017

(30) Foreign Application Priority Data
Feb. 19, 2014 (KR) ......... 10-2014-0018957

(51) Int. Cl.
*H04N 5/232* (2006.01)
*G03B 13/36* (2006.01)

(52) U.S. Cl.
CPC ......... *H04N 5/23212* (2013.01); *G03B 13/36* (2013.01)

(58) Field of Classification Search
CPC ........... H04N 5/23212; H04N 5/23229; H04N 5/262; G03B 13/36
See application file for complete search history.

(56) References Cited

U.S. PATENT DOCUMENTS 8,094,999 B2 * 1/2012 Ohnishi ............ G02B 7/38
396/113
8,648,959 B2 * 2/2014 Capata ............ G06K 9/00255
348/345

(Continued)

FOREIGN PATENT DOCUMENTS

CN 101038363 A 9/2007
CN 103516979 A 1/2014
(Continued)

OTHER PUBLICATIONS

Chinese Office Action dated Sep. 5, 2018; Application #: 201480076043.6.

*Primary Examiner* — Lin Ye
*Assistant Examiner* — Chriss S Yoder, III
(74) *Attorney, Agent, or Firm* — Jefferson IP Law, LLP

(57) ABSTRACT

Various embodiments of the present disclosure are directed to an apparatus and a method for processing an image in an electronic device. In this case, the method for processing an image comprises: a step for obtaining a first image using at least one image sensor; a step of detecting at least one sub-image from the first image; a step for estimating a relative distance between the at least one sub-image using at least one phase difference information obtained by the image sensor; and a step for capturing at least one second image focused on each sub-image using the relative distance between the at least one sub-image. Various embodiments may be possible.

24 Claims, 37 Drawing Sheets

(56) References Cited

U.S. PATENT DOCUMENTS

| | | | |
|---|---|---|---|
| 9,756,241 B2* | 9/2017 | Omori | H04N 5/23229 |
| 2004/0174455 A1 | 9/2004 | Soga | |
| 2007/0230937 A1 | 10/2007 | Ide et al. | |
| 2008/0079839 A1 | 4/2008 | Sung et al. | |
| 2009/0167923 A1 | 7/2009 | Safaee-Rad et al. | |
| 2011/0025904 A1 | 2/2011 | Onuki et al. | |
| 2011/0043655 A1 | 2/2011 | Park et al. | |
| 2012/0007997 A1* | 1/2012 | Oikawa | G03B 13/36 |
| | | | 348/208.6 |
| 2013/0342751 A1 | 12/2013 | Yoshimura | |
| 2014/0009636 A1* | 1/2014 | Lee | H04N 5/23212 |
| | | | 348/222.1 |
| 2014/0198230 A1* | 7/2014 | Tsutsumi | H04N 5/2258 |
| | | | 348/218.1 |
| 2014/0232928 A1* | 8/2014 | Ono | G02B 27/0075 |
| | | | 348/349 |
| 2014/0334683 A1* | 11/2014 | Masuda | H04N 5/23212 |
| | | | 382/103 |

FOREIGN PATENT DOCUMENTS

| | | |
|---|---|---|
| JP | 2004-140798 A | 5/2004 |
| JP | 2009-294471 A | 12/2009 |
| JP | 2012-239078 A | 12/2012 |
| KR | 10-0801088 B1 | 2/2008 |
| KR | 10-2010-0102186 A | 9/2010 |
| KR | 10-2010-0116710 A | 11/2010 |
| KR | 10-2011-0020519 A | 3/2011 |
| KR | 10-2012-0064477 A | 6/2012 |
| WO | 2013/061947 A1 | 5/2013 |
| WO | 2013/088917 A1 | 6/2013 |

* cited by examiner

METHOD FOR PROCESSING IMAGE AND ELECTRONIC APPARATUS THEREFOR

CROSS-REFERENCE TO RELATED APPLICATION(S)

This application is a U.S. National Stage application under 35 U.S.C. § 371 of an International application filed on Dec. 4, 2014 and assigned application number PCT/KR2014/011798, which claimed the benefit of a Korean patent application filed on Feb. 19, 2014 in the Korean Intellectual Property Office and assigned Serial number 10-2014-0018957, the entire disclosure of each of which is hereby incorporated by reference.

BACKGROUND ART

The present disclosure relates to an electronic device and, more particularly, to an image processing method using an electronic device.

With the development of information and communication technologies and semiconductor technologies, various types of electronic devices have developed into multimedia devices that provide various multimedia services. For example, portable electronic devices may provide diverse multimedia services such as broadcast services, wireless Internet services, camera services, and music reproduction services.

The electronic device may provide various services based on an image acquired through an image sensor.

DETAILED DESCRIPTION OF THE INVENTION

Technical Problem

When an image sensor is included, the electronic device may acquire an image by focusing a lens on a particular subject. For example, when a main subject is photographed, the electronic device may photograph an image by focusing the lens on the main subject in order to prevent a background from going out-of-focus because of another subject included in the image. In this case, the electronic device cannot change a focus location to focus on another subject in an image photographed while focused on the main subject or cannot change the focus on the entire image. Accordingly, when an image that focuses on another subject is required, the electronic device should perform photographing again, which is inconvenient for the user.

An embodiment of the present disclosure may provide an apparatus and a method for changing a focus of an image after the electronic device photographs the image.

An embodiment of the present disclosure may provide an apparatus and a method for acquiring a plurality of images that focus on sub images based on a relative distance between sub images detected using at least one piece of phase difference information acquired through an image sensor.

An embodiment of the present disclosure may provide an apparatus and a method for determining a sub image photographed while focused based on the depth of focus of the sub image in the electronic device.

An embodiment of the present disclosure may provide an apparatus and a method for providing an image that focuses on all subjects by the electronic device using a plurality of images having different focal distances acquired using phase different pixels.

An embodiment of the present disclosure may provide an apparatus and a method for providing an image effect based on a relative distance between sub images in the electronic device.

In accordance with an embodiment of the present disclosure, a method of processing an image by an electronic device may include: acquiring a first image by using at least one image sensor including an array of pixels including a phase difference pixel; detecting at least one sub image in the first image; estimating a relative distance between the at least one sub image by using at least one piece of phase difference information acquired using the phase difference pixel; and capturing at least one second image that focuses on each sub image by using the relative distance between the at least one sub image.

In accordance with an embodiment of the present disclosure, an electronic device may include: at least one image sensor configured to include an array of pixels including a phase difference pixel and to acquire or capture an image; and at least one processor, wherein the processor is configured to detect at least one sub image in a first image acquired using the at least one image sensor, to estimate a relative distance between the at least one sub image by using at least one piece of phase difference information acquired using the phase difference pixel, and to capture at least one second image that focuses on each sub image by using the relative distance between the at least one sub image.

In accordance with an embodiment of the present disclosure, a method of driving an electronic device may include: at least temporarily storing an image acquired by an image acquisition device included in the electronic device in a memory; acquiring phase difference information of at least one object included in the image; receiving a user input for capturing an image by the image acquisition device; and capturing a plurality of images in response to the user input, wherein at least two images of the plurality of images have different focal distances, and the focal distance is set at least partially based on the acquired phase difference information.

In accordance with an embodiment of the present disclosure, an electronic device may include: an input module configured to detect a user input; an image acquisition device configured to acquire or capture an image; a memory configured to store an image acquired by the image acquisition device; and at least one processor, wherein the processor is configured to acquire phase difference information of at least one object included in an image acquired by the image acquisition device and temporarily stored in the memory and to capture a plurality of images through the image acquisition device in response to a user input for capturing an image by the image acquisition device detected through the input module, and at least two images of the plurality of images have different focal distances and the focal distance is set at partially based on the acquired phase difference information.

BEST MODE FOR EMBODYING THE INVENTION

Figure 1:
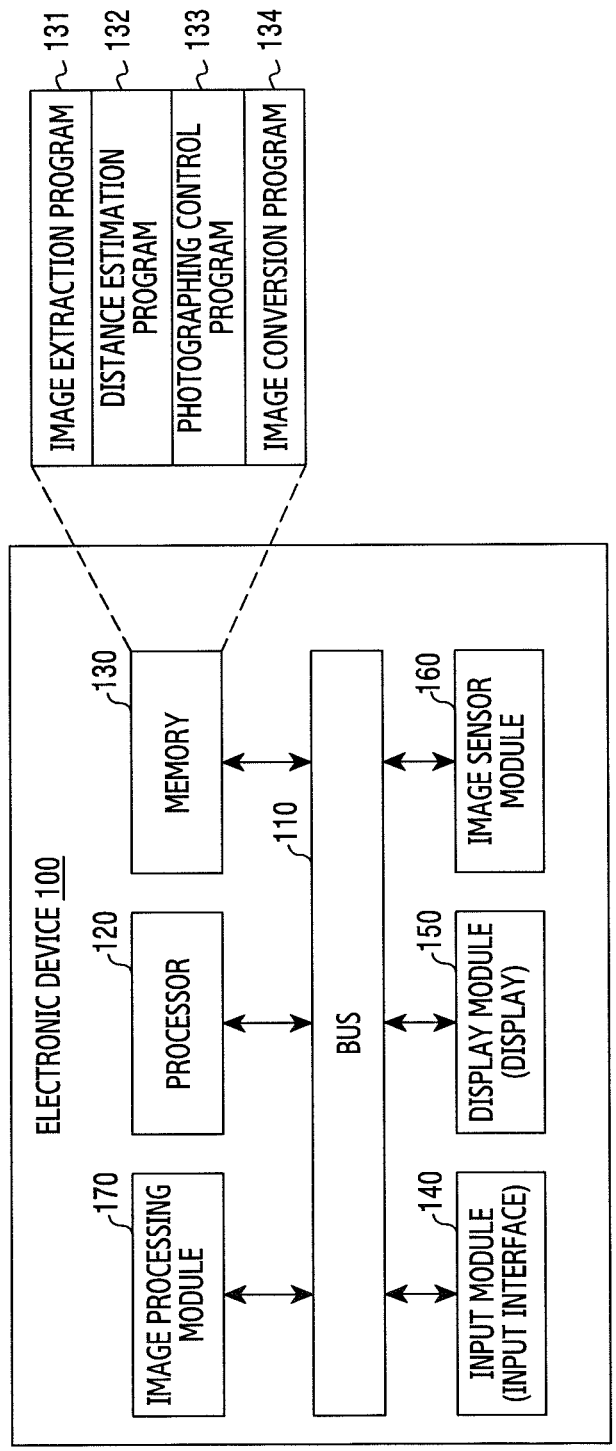
FIG. 1 is a block diagram illustrating an electronic device according to an embodiment of the present disclosure.

Hereinafter, the present disclosure will be described with reference to the accompanying drawings. The present disclosure may have various embodiments, and modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In connection with descriptions of the drawings, like reference numerals designate like elements.

In the present disclosure, the expression "include" or "may include" refers to existence of a corresponding function, operation, or element, and does not limit one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a camera function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a camera function. The smart home appliance as an example of the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device may include at least one of various types of medical devices (e.g., Magnetic Resonance Angiography (MRA), Magnetic Resonance Imaging (MRI), Computed Tomography (CT), a scanning machine, and ultrasonic wave device), a navigation device, a Global Positioning System (GPS) receiver, an Event Data Recorder (EDR), a Flight Data Recorder (FDR), a car infotainment device, electronic equipment for a ship (e.g., navigation equipment for a ship and a gyro compass), avionics, a security device, and an industrial or home robot.

According to some embodiments, the electronic device may include at least one of a part of furniture or a building/structure having a camera function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

Hereinafter, embodiments of the present disclosure may describe a technology for acquiring and processing an image by using a phase difference pixel.

FIG. 1 is a block diagram of an electronic device according to an embodiment of the present disclosure.

Referring to FIG. 1, an electronic device 100 may include a bus 110, a processor 120 (e.g., including processing circuitry), a memory 130, an input module (input interface) 140 (e.g., including input circuitry), a display module (display) 150 (e.g., including a display panel and display circuitry, an image sensor module 160 (e.g., including image sensor circuitry), and an image processing module 170 (e.g., including image processing circuitry) Here, one or more of the processor 120 and the memory 130 may be plural in number.

The bus 110 may connect the elements included in the electronic device 100 and control communication between the elements included in the electronic device 100.

The processor 120 may control the electronic device 100 to provide various services. For example, the processor 120 may decode commands received from one or more different elements (for example, the memory 130, the input module 140, the display module 150, the image sensor module 160, and the image processing module 170 included in the electronic device 100 through the bus 110, and perform calculations or data processing according to the decoded commands.

The processor 120 may execute one or more programs stored in the memory 130 to control the electronic device 100 to provide various services.

The image processing module 170 may control the image sensor module 160 to photograph a plurality of images that focus on different sub images. For example, the image processing module 170 may determine relative distances of sub images (for example, subjects) for successive photographing based on at least one piece of phase difference information acquired through the image sensor module 160. The image processing module 170 may control the image sensor module 160 to photograph a plurality of images that focus on the sub images based on the relative distances of the sub images. For example, the image processing module 170 may acquire at least one piece of phase difference information by using at least one phase difference pixel (for example, at least one pair of phase difference pixels) included in the image sensor module 160.

The image processing module 170 may extract one or more sub images (for example, subjects) for successive photographing from the image acquired through the image sensor module 160. For example, the image processing module 170 may execute an image extraction program 131 and extract sub images for successive photographing based on at least one piece of phase difference information acquired through the image sensor module 160. For example, the image processing module 170 may detect phase difference information (for example, a phase difference code (focus code)) on each of image blocks included in the image acquired through the image sensor module 160 by using at least one phase difference pixel (for example, at least one pair of phase difference pixels) included in the image sensor module 160. The image processing module 170 may group one or more image blocks of which the phase difference information is included within a reference range into image groups. The image processing module 170 may recognize an image group having an image group size (for example, a number of image blocks included in the image group) larger than a threshold value, as a sub image for successive photographing. When a phase difference information value of the image block is reliable, the image processing module 170 may extract a sub image for successive photographing based on phase difference information of image blocks.

The image processing module 170 may estimate relative distances of sub images for successive photographing by using at least one piece of phase difference information acquired through the image sensor module 160. For example, the image processing module 170 may execute a distance estimation program 131 and estimate the relative distances of the sub images for successive photographing. For example, the image processing module 170 may estimate the relative distances of the sub images by comparing pieces of phase difference information of areas of the sub images.

The image processing module 170 may control the image sensor module 160 to photograph a plurality of images that focus on the sub images based on the relative distances of the sub images. For example, the image processing module 170 may execute a photographing control program 133 and control the image sensor module 160 to photograph the plurality of images that focus on the sub images. For example, the image processing module 170 may control the image sensor module 160 to successively photograph the plurality of images by moving the focus of a lens to correspond to the relative distance between the sub images.

When photographing the sub images, the image processing module 170 may control successive photographing corresponding to the sub images based on a depth of focus of the sub images. For example, the image processing module 170 may execute the photographing control program 133 and select a sub image for successive photographing. For example, when two sub images include the same depth of focus, the image processing module 170 may control the image sensor module 160 to photograph an image that focuses on one of the two sub images. In another example, when the two sub images include the same depth of focus, the image processing module 170 may control the image sensor module 160 to photograph an image having a value between focuses of the two sub images. Here, the same depth of focus may mean that a difference between depths of focus is within a threshold range.

When a change in the sub image is detected while successive photographing is performed, the image processing module 170 may control the image sensor module 160 to photograph again the image that focuses on the changed sub image. For example, the image processing module 170 may execute the photographing control program 133 and control the image sensor module 160 to photograph again the images that focus on the changed sub images. For example, the image processing module 170 may identify whether the change in the sub image is detected by comparing the images acquired through the image sensor module 160.

The image processing module 170 may make a control to display a first image of the plurality of images successively photographed through the image sensor module 160 on the display module 150. For program 134 and apply an image effect to at least one different sub image that is not focused in the first image in accordance with a relative distance of at least one other sub image. For example, the image processing module 170 may blur-process at least one other sub image that is not focused in the first image in accordance with a relative distance of at least one other sub image.

When it is identified that a focus change event is generated in a state where the first image is displayed on the display module 150, the image processing module 170 may make a control to extract a second image corresponding to the focus change event from a plurality of images and to display the second image on the display module 150. For example, the image processing module 170 may identify the generation of the focus change event based on input information detected through the input module 140.

The image processing module 170 may generate one image that focuses on a plurality of sub images by combining (or composing) a plurality of images successively photographed through the image sensor module 160. For example, the image processing module 170 may execute the image conversion program 134 and combine a plurality of successively photographed images into one image. For example, in order to compensate for a size difference between sub images due to a difference between view angles of the images, the image processing module 170 may extract a corresponding sub image including an edge spaced apart from an outline of the focused sub image by a reference interval in each image. The image processing module 170 may combine extracted sub images into one image. In another example, the image processing module 170 may edit at least one remaining image based on an image having the smallest angle of view to make angles of view of the successively photographed images the same. The image processing module 170 may extract focused sub images from each image and combine the extracted sub images into one image. For example, the image processing module 170 may crop at least some areas of edges of at least one remaining image based on the image having the smallest angle of view and then extract sub images to be combined.

The memory 130 may store commands or data received from or generated by one or more elements (for example, the processor 120, the input module 140, the display module 150, the image sensor module 160, and the image processing module 170) included in the electronic device 100. For example, the memory 130 may store a plurality of images successively photographed through the image sensor module 160 into one file. In another example, the memory 130 may store the first image displayed on the display module 150 and at least one remaining image among the plurality of images successively photographed through the image sensor module 160 in different memory areas. In this case, the memory 130 may store at least one remaining image as one file. In another example, the memory 130 may store the images successively photographed through the image sensor module 160 as different files.

The memory 130 may store one or more programs for services of the electronic device 100. For example, the memory 130 may include one or more of the image extraction program 131, the distance estimation program 132, the photographing control program 133, and the image conversion program 134.

The image extraction program 131 may include at least one software component for extracting one or more sub images (for example, subjects) for successive photographing based on at least one piece of phase difference information acquired through the image sensor module 160.

The distance estimation program 132 may include at least one software component for estimating relative distances of sub images for successive photographing based on at least one piece of phase difference information acquired through the image sensor module 160.

The photographing control program 133 may include at least one software component for controlling the image sensor module 160 to successively photograph images that focus on sub images based on the relative distances of the sub images estimated through the distance estimation program 132.

The image conversion program 134 may include at least one software component for image conversion of the plurality of images successively photographed through the image sensor module 160.

The input module (input interface) 140 may transmit commands or data generated by a user' selection to the processor 120 or the memory 130 through the bus 110. For example, the input module 140 may include one or more of a keypad having at least one hardware button and a touch panel for detecting touch information.

The display module (display) 150 may display an image, a video, or data for the user. For example, the display module 150 may display information on an application program driven by the processor 120. In another example, the display module 150 may display an image photographed (captured) through the image sensor module 160.

The image sensor module 160 may provide an image acquired by photographing a subject to the processor 120. For example, the image sensor module 160 may collect an image including a plurality of color pixels and at least one piece of phase difference information and provide the collected image to at least one of the processor 120 and the image processing module 170. Here, the image sensor module 160 may include at least one image sensor module connected to the electronic device 100.

The electronic device 100 may further include a communication module (communication interface) for connecting communication between at least one other electronic device, a server, or at least one peripheral device and the electronic device 100. For example, the communication module may support a short-range communication protocol (for example, Wi-Fi (wireless fidelity), Bluetooth, or NFC (near field communication)), a network communication protocol (for example, Internet, LAN (local area network), WAN (wide area network), telecommunication network, cellular network, or satellite network), or a wired communication protocol (for example, USB (universal serial bus) or a HDMI (high definition multimedia interface)). At this time, the communication protocol (for example, short range communication protocol, network communication protocol, or wired communication protocol) may support middleware of the memory 130 or an API (application programming interface). Here, another electronic device may be a peripheral device of the electronic device and may include a device which is the same type as or different type from the electronic device 100.

In the above described embodiment, the image processing module 170 may make a control to acquire and process an image within one module.

Figure 2A:
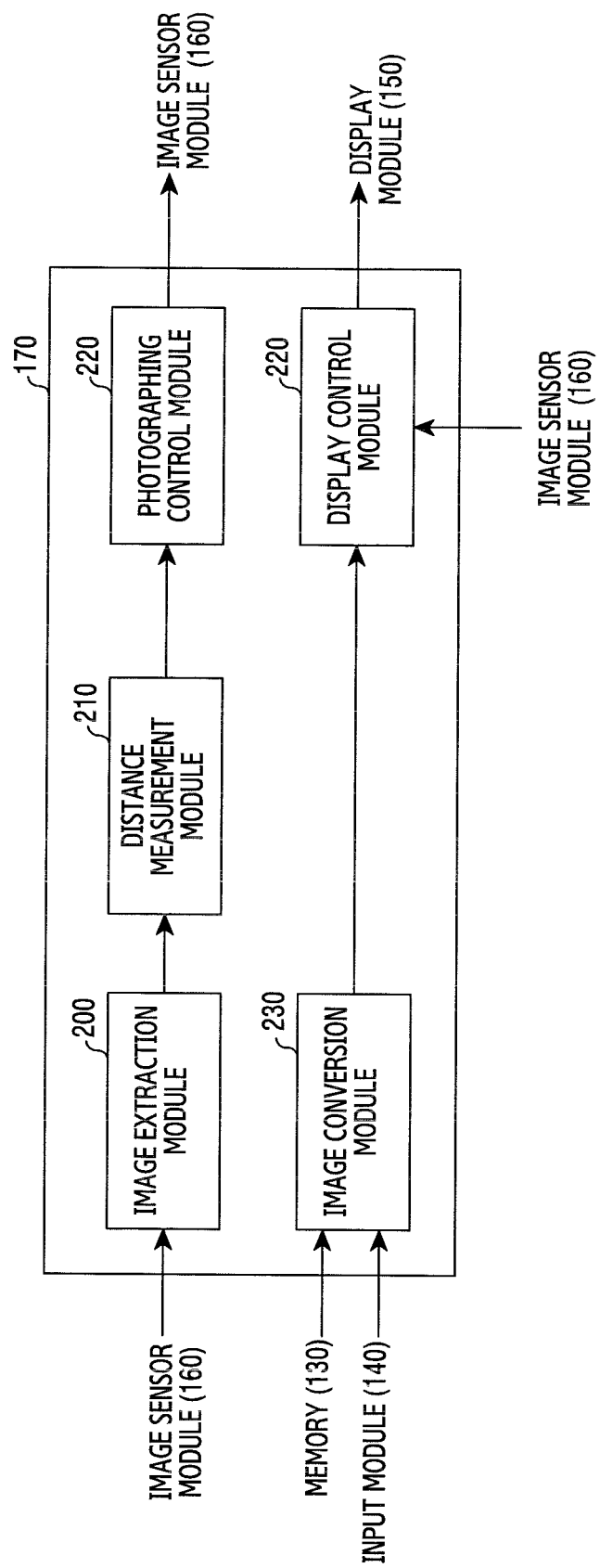
FIG. 2A is a detailed block diagram illustrating an image processing module according to an embodiment of the present disclosure.

In another embodiment, the image processing module 170 may include separate hardware, software, or firmware modules, or a combination thereof for acquiring and processing the image as illustrated in FIG. 2A.

FIG. 2A is a block diagram illustrating in detail the image processing module according to an embodiment of the present disclosure.

Referring to FIG. 2A, the image processing module 170 may include an image extraction module 200, a distance estimation module 210, a photographing control module 220, and an image conversion module 230. Each of the aforementioned modules may include hardware, software, firmware, or a combination thereof. For example, when each module is implemented by software, each module may be functionally provided by one or more processors (for example, an image processing processor, an application processor, or a combination thereof).

The image extraction module 200 may extract one or more sub images (for example, subjects) for successive photographing from the image acquired through the image sensor module 160. For example, the image extraction module 200 may execute the image extraction program 131 and extract sub images for successive photographing based on at least one piece of phase difference information acquired through the image sensor module 160. For example, the image extraction module 200 may detect phase difference information (for example, a phase difference code (focus code)) on each of image blocks included in the image acquired through the image sensor module 160 by using at least one phase difference pixel (for example, at least one pair of phase difference pixels) included in the image sensor module 160. The image extraction module 200 may group one or more image blocks of which the phase difference information is included within a reference range into image groups. The image processing module 170 may recognize an image group having an image group size (for example, a number of image blocks included in the image group) larger than a threshold value, as a sub image for successive photographing. When a phase difference information value of the image block is reliable, the image extraction module 200 may extract sub images for successive photographing, based on phase difference information of image blocks.

The distance estimation module 210 may estimate relative distances of sub images for successive photographing, by using at least one piece of phase difference information acquired through the image sensor module 160. For example, the distance estimation module 210 may execute the distance estimation program 131 and estimate the relative distances of the sub images for successive photographing. For example, the distance estimation module 210 may estimate the relative distance between sub images by comparing phase difference information of each sub image area.

The photographing control module 220 may control the image sensor module 160 to photograph a plurality of images that focus on the sub images based on the relative distances of the sub images. For example, the photographing control module 220 may execute the photographing control program 133 and control the image sensor module 160 to photograph the plurality of images that focus on the sub images. For example, the photographing control module 220 may control the image sensor module 160 to successively photograph the plurality of images by moving the focus of a lens to correspond to the relative distance between the sub images.

When photographing the sub images, the photographing control module 220 may control successive photographing corresponding to the sub images based on depths of focus of the sub images. For example, when two sub images include the same depth of focus, the photographing control module 220 may control the image sensor module 160 to photograph an image that focuses on one of the two sub images. In another example, when the two sub images include the same depth of focus, the photographing control module 220 may control the image sensor module 160 to photograph an image having a value between focuses of the two sub images.

When a change in the sub image is detected while successive photographing is performed, the photographing control module 220 may control the image sensor module 160 to photograph again the image that focuses on the changed sub image. For example, the photographing control module 220 may identify whether the change in the sub image is detected by comparing images acquired through the image sensor module 160.

The image conversion module 230 may apply an image effect to at least one sub image, which is not focused, based on the relative distance between the sub images. For example, the image conversion module 230 may execute the image conversion program 134 and apply the image effect to the sub images. For example, when displaying a first image of the plurality of images successively photographed through the image sensor module 160 on the display module 150, the image conversion module 230 may perform blur processing on at least one other sub image, which is not focused in the first image, in accordance with a relative distance of at least one other sub image.

When a focus change event is generated in a state where the first image is displayed on the display module 150, the image conversion module 230 may extract a second image corresponding to the focus change event among the plurality of images and make a control to display the second image on the display module 150. For example, the image conversion module 230 may identify the generation of the focus change event based on input information detected through the input module 140.

The image conversion module 230 may generate one image, which focuses on a plurality of sub images, by combining the plurality of images successively photographed through the image sensor module 160. For example, the image conversion module 230 may execute the image conversion program 134 and combine the plurality of successively photographed images into one image. For example, in order to compensate for a size difference between sub images due to a difference between view angles of the images, the image conversion module 230 may extract a corresponding sub image including an edge spaced apart from an outline of the focused sub image by a reference interval in each image. The image conversion module 230 may combine the extracted sub images into one image. In another example, the image conversion module 230 may edit at least one remaining image based on an image having the smallest angle of view to make angles of view of the successively photographed images the same. The image conversion module 230 may extract focused sub images from each image and combine the sub images into one image. For example, the image conversion module 230 may crop at least some areas of edges of at least one remaining image based on the image having the smallest angle of view and then extract sub images to be combined.

In addition, the image processing module 170 may further include a display control module 240 for making a control to graphically provide a user interface on the display module 150. For example, the display control module 240 may control the display module 150 to display an image photographed (captured) through the image sensor module 160. For example, the display control module 240 may control the display module 150 to display a first image among the plurality of images acquired through successive photographing using the image sensor module 160. In another example, the display control module 240 may make a control to convert the image displayed on the display module 150 according to a control of the image conversion module 230.

In the above described embodiment, the electronic device 100 may make a control to acquire and process the image by using the image processing module 170.

According to another embodiment, the electronic device 100 may make a control to acquire and process the image by using the processor 120.

Figure 2B:
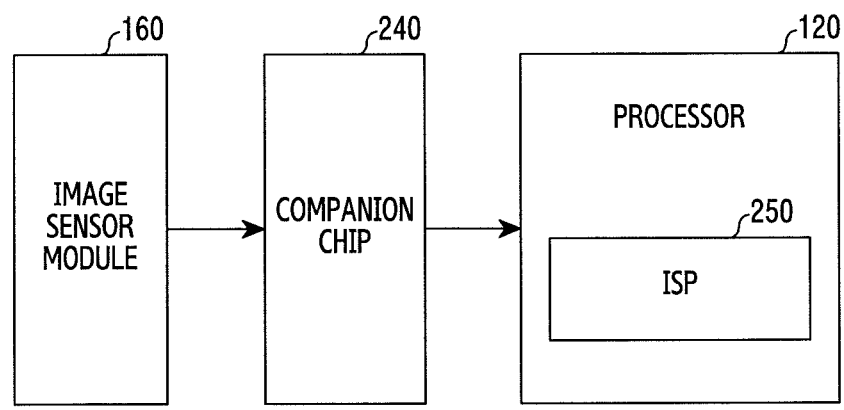
FIG. 2B is a detailed block diagram illustrating an electronic device according to an embodiment of the present disclosure.

FIG. 2B is a block diagram illustrating in detail the electronic device according to an embodiment of the present disclosure.

Referring to FIG. 2B, the electronic device 100 may include the image sensor module 160, a companion chip 240, and the processor (for example, application processor) 120.

The image sensor module 160 may acquire an image by photographing a subject. For example, the image sensor module 160 may acquire an image including a plurality of color pixels and at least one piece of phase difference information.

The companion chip 240 may detect at least one piece of phase difference information on the image acquired through the image sensor module 160. For example, the companion chip 240 may detect phase difference information (for example, a phase difference code (focus code)) on each of image blocks included in the image acquired through the image sensor module 160 by using at least one phase difference pixel (for example, at least one pair of phase difference pixels) included in the image sensor module 160.

The processor 120 may include an Image Signal Processor (ISP) 250 for making a control to acquire and process the image.

The image processor 250 may extract one or more sub images (for example, subjects) for successive photographing from the image acquired through the image sensor module 160. For example, the image processor 250 may group one or more image blocks into image groups, wherein phase difference information of the image block provided from the companion chip 240 is included within a reference range. The image processor 250 may recognize an image group having an image group size (for example, a number of image blocks included in the image group) larger than a threshold value as a sub image for successive photographing. When a phase difference information value of the image block is reliable, the image processor 250 may extract the sub image for successive photographing based on the phase difference information of each image block.

The processor 120 including the image processor 250 may estimate relative distances of the sub images for successive photographing based on at least one piece of phase difference information provided from the companion chip 240. For example, the estimation of the relative distances of the sub images may be performed by hardware such as a module or core logically or physically separated from the image processor 250 within the processor 120, software, firmware, or a combination thereof.

The image processor 250 may control the image sensor module 160 to photograph a plurality of images that focus on sub images based on the relative distances of the sub images. For example, the image processor 250 may control the image sensor module 160 to successively photograph the plurality of images by moving the focus of a lens to correspond to the relative distance between the sub images.

When photographing the sub images, the image processor 250 may control the successive photographing corresponding to the sub images based on depths of focus of the sub images.

When a change in the sub image is detected while successive photographing is performed, the image processor 250 may control the image sensor module 160 to photograph again the image that focuses on the changed sub image.

The image processor 250 may make a control to display a first image among the plurality of images successively photographed through the image sensor module 160 on the display module 250. For example, the image processor 250 may apply an image effect to at least one other sub image that is not focused in the first image in accordance with a relative distance of at least one other sub image. Here, the image effect may include an out-focusing effect which performs blur processing on at least one other sub image that is not focused.

When generation of a focus change event is identified in a state where the first image is displayed on the display module 150, the image processor 250 may make a control to extract a second image corresponding to the focus change event from a plurality of images and to display the extracted second image on the display module 150. For example, the image processor 250 may identify the generation of the focus change event based on input information detected through the input module 140.

The image processor 250 may generate one image, which focuses on a plurality of sub images, by combining the plurality of images successively photographed through the image sensor module 160.

According to various embodiments of the present disclosure, an electronic device may include at least one image sensor configured to acquire or capture an image, and at least one processor, wherein the processor may be configured to detect at least one sub image in a first image acquired using the at least one image sensor, to estimate a relative distance between the at least one sub image by using at least one piece of phase difference information acquired using the phase difference pixel, and to capture at least one second image that focuses on each sub image by using the relative distance between the at least one sub image.

According to various embodiments, the processor may detect at least one sub image in a first image including a plurality of color pixels and at least one piece of phase difference information by using the at least one image sensor.

According to various embodiments, the processor may divide the first image into a plurality of image blocks, detect phase difference information of each image block, and detect at least one sub image based on the phase difference information of said each image block.

According to various embodiments, the processor may group at least one image block having the phase difference information included within a reference range and detect at least one sub image based on a number of grouped image blocks.

According to various embodiments, when at least one sub image is detected based on the phase difference information, the processor may detect a depth of focus of each sub image and extract at least one sub image based on the depth of focus of said each sub image.

According to various embodiments, the electronic device may further include a display module configured to display a third image that focuses on a first sub image of the at least one second image acquired according to a control of the processor.

According to various embodiments, the electronic device may further include an input module, wherein the display module may display, when selection of a second sub image is detected in the third image through the input module, a fourth image that focuses on a second sub image of the at least one second image.

According to various embodiments, the electronic device may further include an input module, wherein the display module may display information on the at least one second image on the display module when a focus change event is generated, and display a fifth image when selection of the fifth image of the at least one displayed second image through the input module.

According to various embodiments, based on a relative distance between the first sub image and at least one other sub image, the processor may blur-process the at least one other sub image in the third image, and the display module may display the third image blur-processed by the image processing module.

According to various embodiments, the processor may blur-process at least one image block including an outline of the first sub image based on blur information of a neighboring image block.

According to various embodiments, the processor may divide at least one image block including the outline of the first sub image into at least one area based on the outline of the first sub image and blur-process at least one area included in each image block based on blur information of at least one neighboring image block adjacent to each area.

According to various embodiments, the electronic device may further include a display module configured to display an image and a memory, wherein, when a third image that focuses on a first sub image of the at least one second image is displayed, the memory may store the third image and at least one remaining image of the at least one second image into different memory areas.

According to various embodiments, the electronic device may further include a memory, wherein the memory may store the at least one second image and focus information of each second image as one file.

According to various embodiments, the processor may extract focused sub images in each second image and combine the extracted sub images into one image.

According to various embodiments, the processor may determine an extraction ratio of at least one remaining sub image based on a size of one of the at least one sub image and extract each sub image to include an edge part spaced apart from an outline of at least one remaining sub image by a predetermined interval based on the extraction ratio.

According to various embodiments, the processor may edit at least one remaining image based on a view angle of one reference image of the at least one second image and extract a focused sub image from the reference image and the at least one remaining edited image.

According to various embodiments, the processor may crop at least some areas of an edge of at least one remaining image based on the view angle of one reference image of the at least one second image.

According to various embodiments of the present disclosure, an electronic device may include: an input module configured to detect a user input, an image acquisition device configured to acquire or capture an image, a memory configured to store an image acquired by the image acquisition device, and at least one processor, wherein the processor may be configured to acquire phase difference information of at least one object included in an image acquired by the image acquisition device and temporarily stored in the memory and to capture a plurality of images through the image acquisition device in response to a user input for capturing an image by the image acquisition device detected through the input module, and at least two images of the plurality of images may have different focal distances, and the focal distance may be set at least partially based on the acquired phase difference information.

Figure 3A:
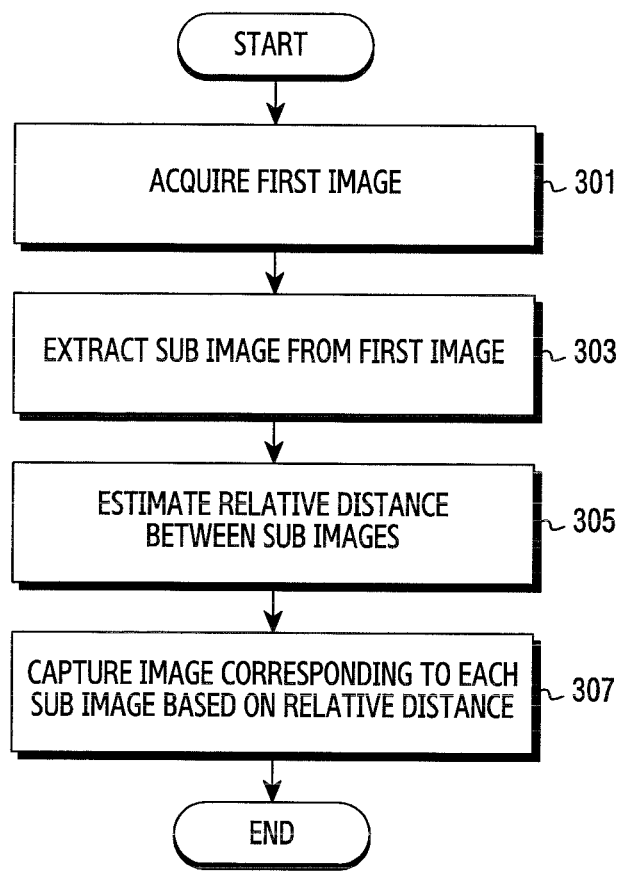
FIG. 3A illustrates a procedure in which the electronic device captures a plurality of images corresponding to sub images according to an embodiment of the present disclosure.
Figure 4A:
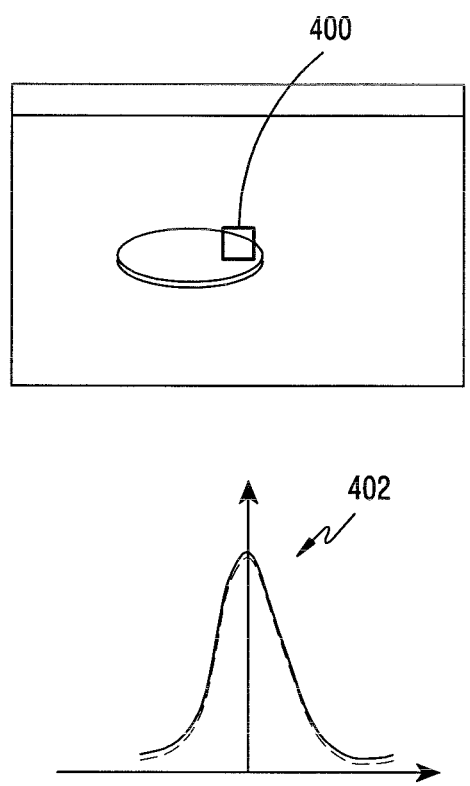
FIGS. 4A to 4C illustrate phase difference information of phase different pixels acquired through an image sensor according to an embodiment of the present disclosure.
Figure 4B:
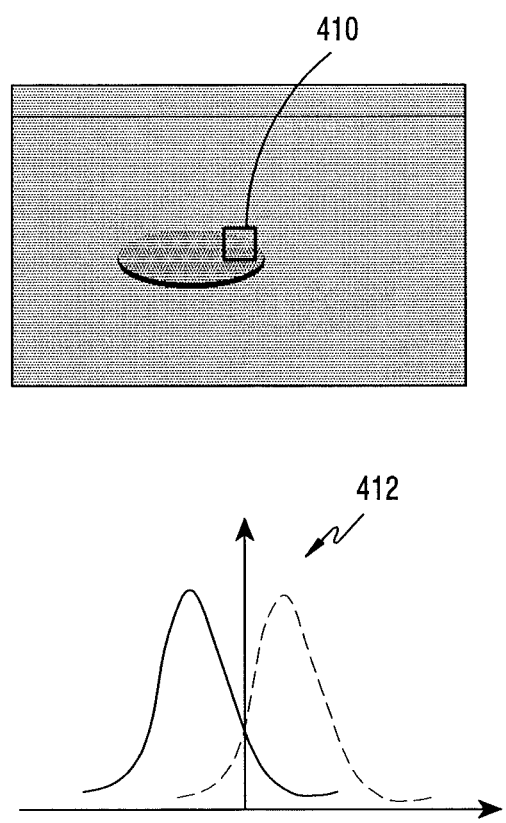
Figure 4C:
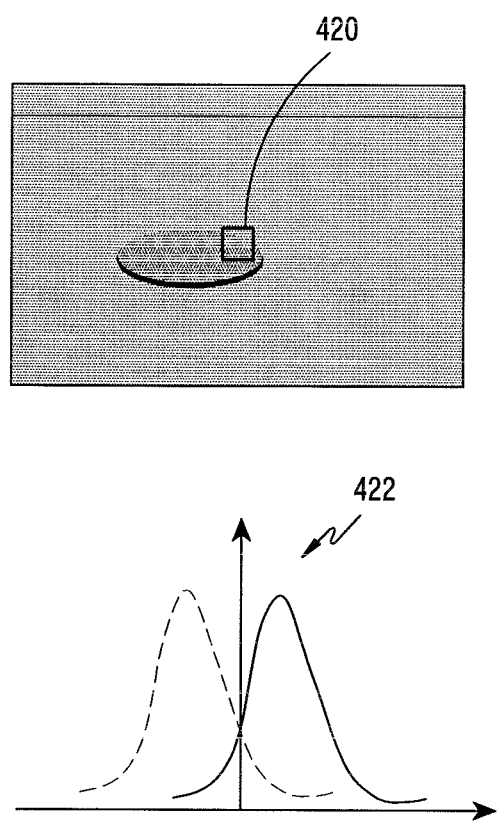

FIG. 3A illustrates a procedure for capturing a plurality of images corresponding to sub images in the electronic device according to an embodiment of the present disclosure. Hereinafter, features of estimating a relative distance between sub images based on phase difference information detected through phase difference pixels illustrated in FIGS. 4A to 4C will be described and features of acquiring images corresponding to sub images based on an image configuration illustrated in FIGS. 5A to 5D will be described.

Referring to FIG. 3A, the electronic device may acquire a first image through the image sensor module 160 in operation 301.

The electronic device may extract at least one sub image (or object) for successive photographing from the first image in operation 303. For example, the electronic device may extract at least one sub image for successive photographing based on at least one of a size of the sub image included in the first image and phase difference information between image blocks included in the first image.

The electronic device may estimate relative distances of sub images for successive photographing based on phase difference pixels in operation 305. For example, when a lens focuses on a sub image as indicated by reference numeral 400 in FIG. 4A, one pair of phase difference pixels located in the corresponding sub image area may include similar or identical phase information as indicated by reference numeral 402. In contrast, when the lens does not focus on the sub image as indicated by reference numerals 410 and 420 in FIGS. 4B and 4C, one pair of phase difference pixels located in the corresponding sub image area include different pieces of phase information and thus disparity 412 and 412 may occur. Accordingly, the electronic device may estimate the relative distance between sub images by comparing phase difference information according to one pair of phase difference pixels located in each sub image area for successive photographing. In addition, when a human face is included within the first image, the electronic device may estimate the relative distance between the sub images additionally with reference to the size of the human face detected through face detection.

Figure 5A:
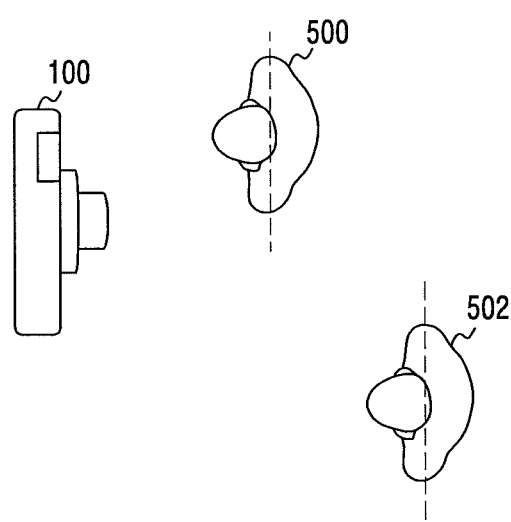
FIGS. 5A to 5D illustrate a configuration of an image corresponding to sub images in the electronic device according to an embodiment of the present disclosure.
Figure 5B:
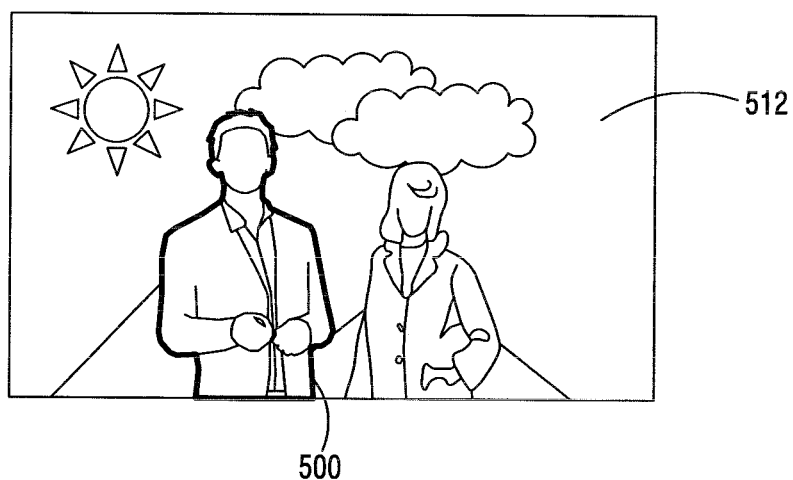
Figure 5C:
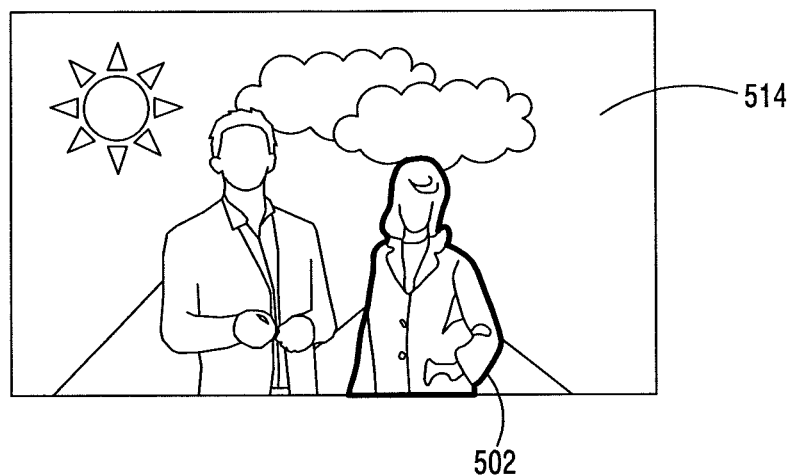
Figure 5D:
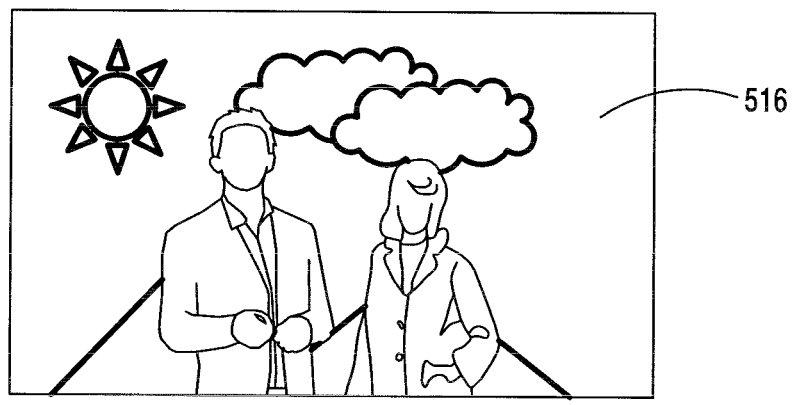

The electronic device may photograph (capture) at least one image that focuses on each sub image by moving the focus of the lens based on the relative distance of the sub image in operation 307. For example, when distances of a first subject 500 and a second subject 502 from the electronic device 100 are different as illustrated in FIG. 5A, the electronic device may photograph (capture) a first image 512 that focuses on the first subject 500 as illustrated in FIG. 5B, a second image 514 that focuses on the second subject 502 as illustrated in FIG. 5C, and a third image 516 that focuses on a background as illustrated in FIG. 5D. At this time, in the first image 512, the second image 514, and the third image 516, the electronic device may clearly display a focused sub image and vaguely display another sub image based on a relative distance from the focused sub image.

According to various embodiments of the present disclosure, a method of processing an image by an electronic device may include an operation of acquiring a first image by using at least one image sensor including an array of pixels including a phase difference pixel, an operation of detecting at least one sub image in the first image; estimating a relative distance between the at least one sub image by using at least one piece of phase difference information acquired using the phase difference pixel, and an operation of capturing at least one second image that focuses on each sub image by using the relative distance between the at least one sub image.

According to various embodiments, the operation of acquiring the first image may include an operation of acquiring the first image including a plurality of color pixels and at least one piece of phase difference information by using the at least one image sensor.

Figure 3B:
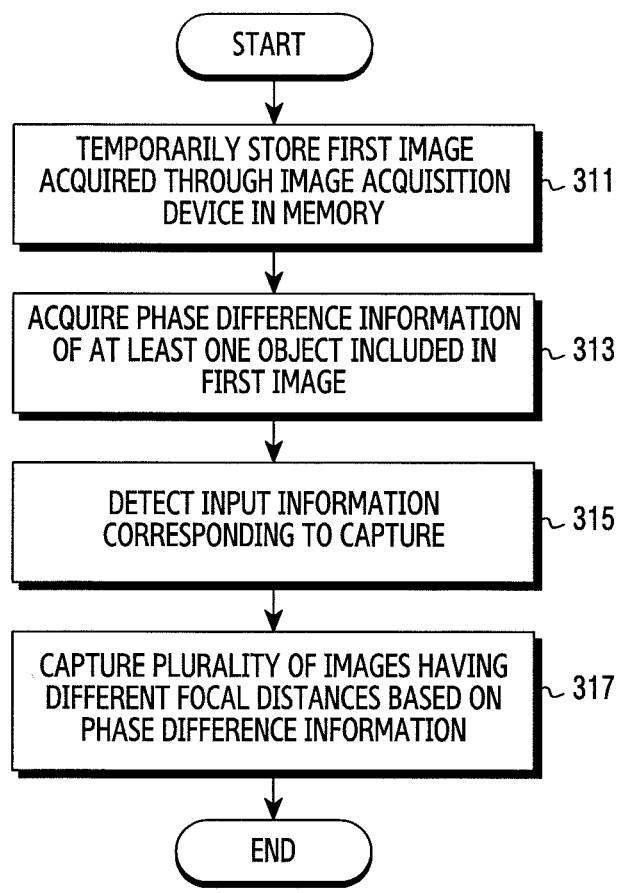
FIG. 3B illustrates a procedure in which the electronic device captures a plurality of images having different focal distances according to an embodiment of the present disclosure.

FIG. 3B illustrates a procedure in which the electronic device captures a plurality of images having different focal distances according to an embodiment of the present disclosure.

Referring to FIG. 3B, the electronic device may temporarily store a first image acquired through an image acquisition device (for example, the image sensor module 160) in the memory in operation 311.

The electronic device may acquire phase difference information of at least one object included in the first image in operation 313. For example, the electronic device may acquire phase difference information of at least one object included in the first image by using at least one phase difference pixel (for example, at least one pair of phase difference pixels) included in the image acquisition device. Here, the object may include at least one sub image for successive photographing included in the first image.

The electronic device may identify whether input information corresponding to image capturing is detected in operation 315. For example, the electronic device may identify whether a user input corresponding to successive photographing is detected through the input module 140. In another example, the electronic device may identify whether a user gesture input corresponding to an event for successive photographing is detected.

The electronic device may photograph (capture) a plurality of images having different focal distances based on phase difference information of at least one object in operation 317.

According to various embodiments of the present disclosure, a method of driving an electronic device may include an operation of at least temporarily storing an image acquired by an image acquisition device included in the electronic device in a memory, an operation of acquiring phase difference information of at least one object included in the image; receiving a user input for capturing an image by the image acquisition device, and an operation of capturing a plurality of images in response to the user input, wherein at least two images of the plurality of images have different focal distances, and the focal distance is set at least partially based on the acquired phase difference information.

According to various embodiments, the operation of acquiring the phase difference information may include an operation of acquiring phase difference information of at least one object included in the image by using at least one phase difference pixel included in the image acquisition device (for example, at least one pair of phase difference pixels).

Figure 6:
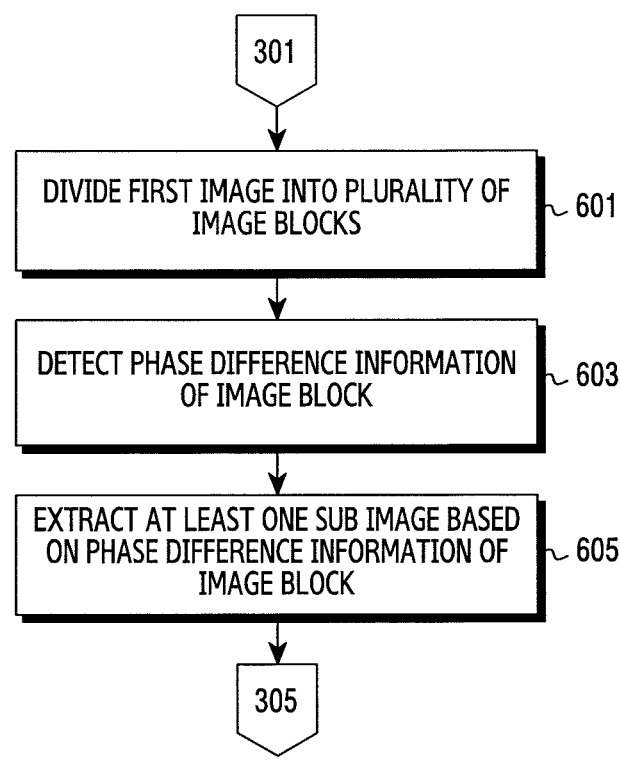
FIG. 6 illustrates a procedure in which the electronic device extracts a sub image for acquiring an image according to an embodiment of the present disclosure.

FIG. 6 illustrates a procedure in which the electronic device extracting a sub image to acquire an image according to an embodiment of the present disclosure. Hereinafter, features for extracting a sub image will be described with reference to FIGS. 7A to 7B.

Figure 7A:
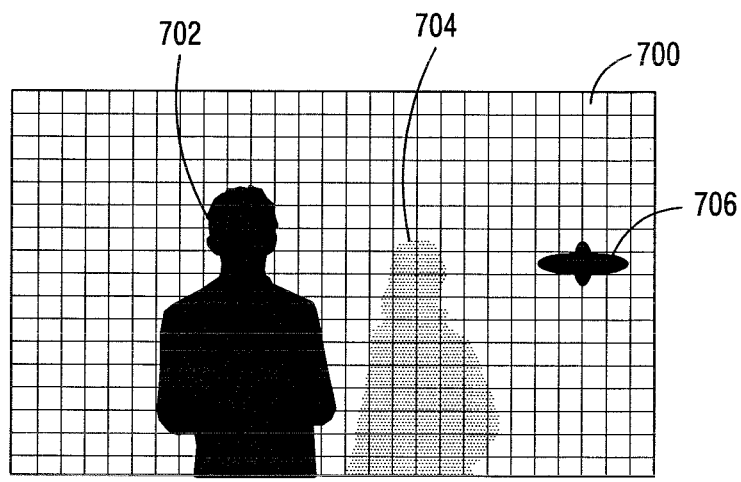
FIGS. 7A to 7B illustrate a configuration for extracting a sub image based on phase difference information of an image block by the electronic device according to an embodiment of the present disclosure.

Referring to FIG. 6, when a first image is acquired in operation 301 of FIG. 3A, the electronic device may divide the first image into a plurality of image blocks in operation 601. For example, the electronic device may divide the first image into a plurality of image blocks 700 as illustrated in FIG. 7A. Here, the image block may indicate a unit for detecting phase difference information by using at least one pixel difference pixel (for example, at least one pair of phase difference pixels) included in the image sensor module 160. For example, one image block may be configured by 16×16 color pixel units.

The electronic device may detect phase difference information of each image block in operation 603. For example, the electronic device may detect phase difference information of each image block by using at least one phase difference pixel (for example, at least one pair of phase difference pixels) included in the image sensor module 160.

Figure 7B:
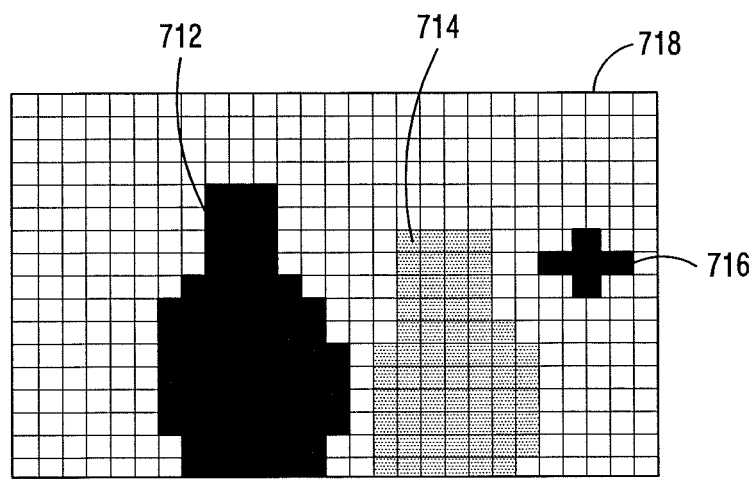

The electronic device may extract at least one sub image for successive photographing from the first image based on phase difference information of each image block in operation 605. For example, the electronic device may group a plurality of image blocks into at least one image group based on phase difference information of the image block. For example, as illustrated in FIG. 7B, the electronic device may group one or more image blocks having phase difference information included within a reference range into at least one image group to generate an image group 712 of a first subject 702, an image group 714 of a second subject 704, an image group 716 of a third subject 706, and an image group 718 of a fourth subject (for example, background). The electronic device may recognize an image group having an image group size (for example, a number of image blocks included in the image group) larger than a threshold value as a sub image for successive photographing. For example, the number of image blocks included in the image group 712 of the first subject 702, the image group 714 of the second subject 704, and the image group 718 of the fourth subject (for example, background) is larger than a threshold number of blocks, the electronic device may recognize the first subject 702, the second subject 704, and the fourth subject (for example, background) as sub images for successive photographing.

When at least one sub image for successive photographing is extracted in operation 605, the electronic device may estimate a relative distance between the corresponding sub images in operation 305 of FIG. 3A.

In the above described embodiment, the electronic device may extract at least one sub image for successive photographing based on phase difference information of the image block. When phase difference information of image blocks are reliable, the electronic device may extract at least one sub image for successive photographing based on the phase difference information of the image blocks.

According to various embodiments, the operation of detecting the sub image may include an operation of dividing the first image into a plurality of image blocks, an operation of detecting phase difference information of each image block, and an operation of detecting at least one sub image based on the phase difference information of said each image block.

According to various embodiments, the operation of detecting the sub image based on the phase difference information may include an operation of grouping at least one image block having the phase difference information included within a reference range and an operation of detecting at least one sub image based on a number of grouped image blocks.

Figure 8:
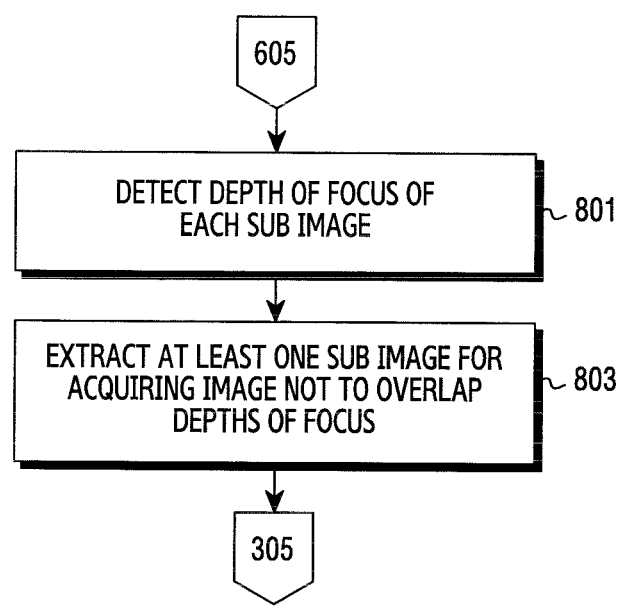
FIG. 8 illustrates a procedure in which the electronic device extracts a sub image for image photographing based on the depth of focus of the sub image according to an embodiment of the present disclosure.

FIG. 8 illustrates a procedure in which the electronic device extracts a sub image for image photographing based on the depth of focus of the sub image according to an embodiment of the present disclosure. Hereinafter, features for extracting a sub image based on the depth of focus will be described with reference to FIG. 9.

Figure 9:
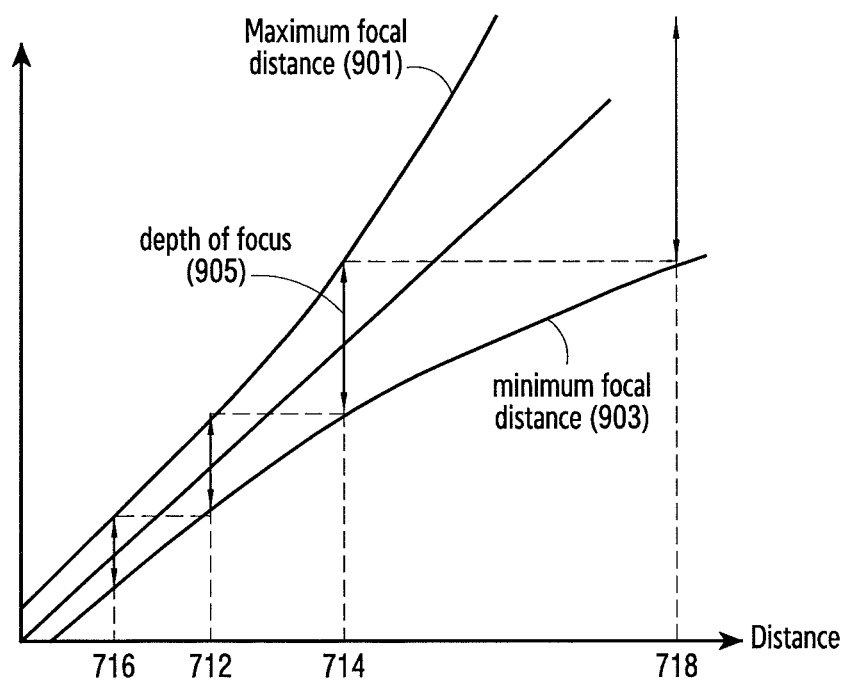
FIG. 9 illustrates depths of focus of sub images according to an embodiment of the present disclosure.

Referring to FIG. 8, when at least one sub image for successive photographing is extracted based on phase difference information of the image block in operation 605 of FIG. 6, the electronic device may detect the depth of focus of each sub image in operation 801. For example, the electronic device may detect the depth of focus 905 of the corresponding sub image by calculating a difference between a maximum focal distance 901 and a minimum focal distance 903 of a lens corresponding to a distance between the electronic device and the sub image as illustrated in FIG. 9. Here, the maximum focal distance and the minimum focal distance of the lens may be determined at a time point of the design of the lens.

The electronic device may select at least one sub image for successive photographing to limit overlapping photographing of sub images located on the same depth of focus in operation 803. For example, the electronic device may select at least one sub image for successive photographing from at least one sub image extracted in operation 605 of FIG. 6 based on the depth of focus of each sub image. Here, the same depth of focus may mean that a difference between depths of focus is within a threshold range.

When at least one sub image for successive photographing is selected in operation 803, the electronic device may estimate a relative distance between corresponding sub images in operation 305 of FIG. 3A.

According to various embodiments, an operation of detecting the sub image may further include, when at least one sub image is detected based on the phase difference information, an operation of detecting the depth of focus of each sub image and an operation of extracting at least one sub image based on the depth of focus of each sub image.

In the above described embodiment, the electronic device may extract at least one sub image based on phase difference information of the image block and then select at least one sub image for successive photographing based on the depth of focus of each sub image.

In another embodiment, the electronic device may perform successive photographing of images that focus on sub images based on the relative distance between sub images and the depth of focus of each sub image in operation 307 of FIG. 3A. For example, when two sub images include the same depth of focus, the electronic device may photograph an image that focuses one sub image among the two sub images. In another example, when two sub images include the same depth of focus, the electronic device may photograph an image having a value between the focuses of the two sub images.

As described above, the electronic device may successively photograph a plurality of images that focus on the sub images. The electronic device may store the plurality of successively photographed images as one file configured as illustrated in FIG. 10 below or as different files.

Figure 10:
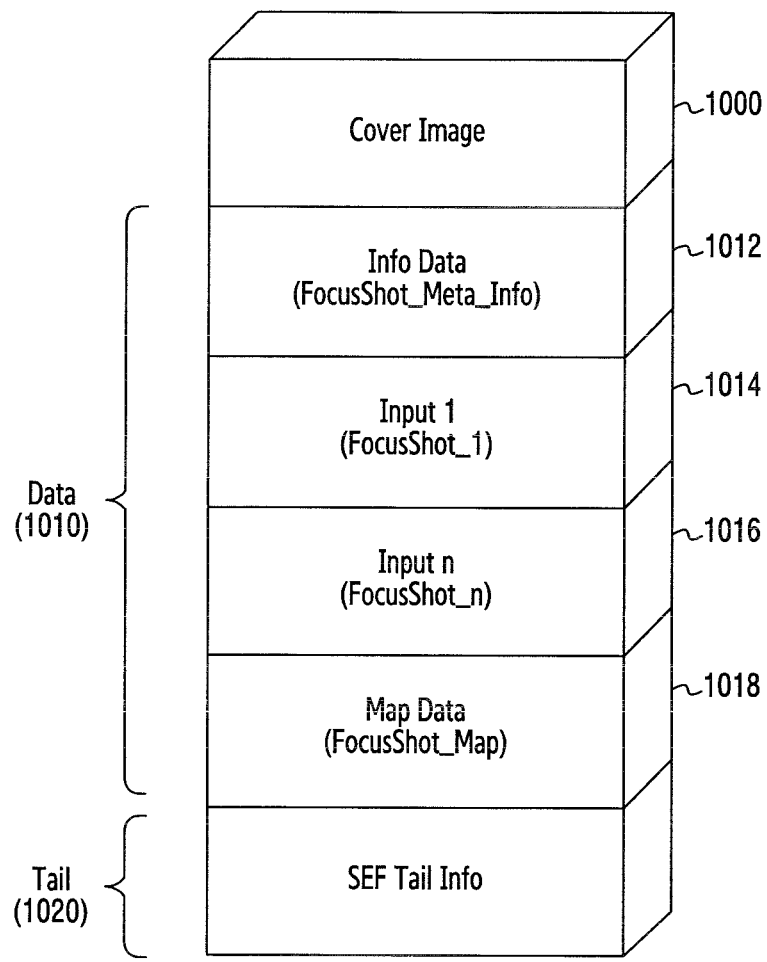
FIG. 10 illustrates a configuration of a file including a plurality of images according to an embodiment of the present disclosure.

FIG. 10 illustrates a configuration of a file including a plurality of images according to an embodiment of the present disclosure.

Referring to FIG. 10, a file having a plurality of successively photographed images may include a representative image 1000, data 1010, and additional information 1020.

The representative image 1000 may include an image displayed on the display module 150 among the plurality of successively photographed images.

The data 1010 may include info data 1012, image information (inputs) 1014 to 1016, and map data 1018.

The info data 1012 may store data such as header information of an image file included in the representative image 1000, segmentation map information, and index information of each image. Here, the segmentation map may indicate focused sub image information in each image.

The image information 1014 to 1016 may include at least one remaining image except for the image displayed on the display module 150 among the plurality of successively photographed images.

The map data 1018 may include detailed information of sub images included in each image included in the image information 1014 to 1016.

Various embodiments may include, when a third image of the successively photographed images is displayed on the display module, an operation of storing the third image and at least one remaining image among the successively photographed images in different memory areas.

Various embodiments may include an operation of storing the successively photographed images and focus information of each image as one file.

In the above described embodiment, when a plurality of images that focus on different sub images are captured through successive photographing, the electronic device may select a first image that focuses on a first sub image among the plurality of images and display the selected first image on the display module 150. The electronic device may provide an image effect by editing the first image based on a relative distance between the sub images as illustrated in FIG. 11.

Figure 11:
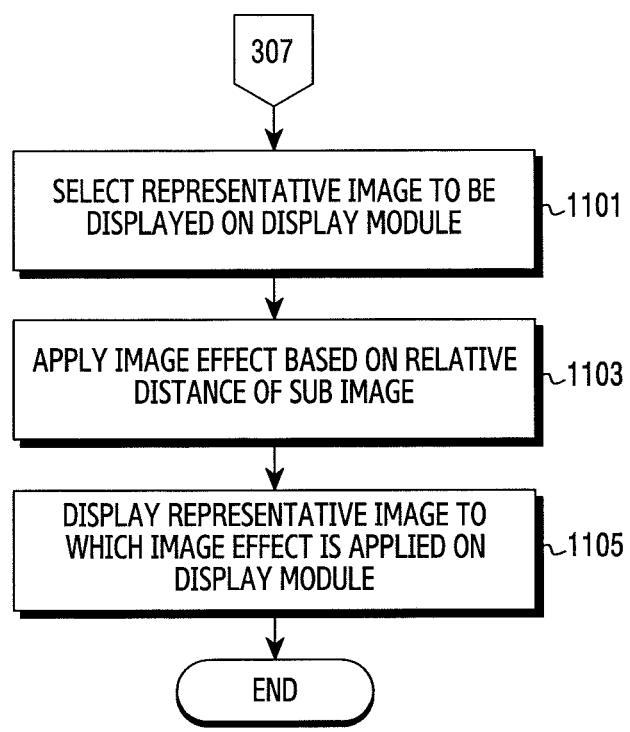
FIG. 11 illustrates a procedure in which the electronic device edits an image according to an embodiment of the present disclosure.

FIG. 11 illustrates a procedure in which the electronic device edits an image according to an embodiment of the present disclosure. Hereinafter, features of performing blur processing on an image will be described with reference to FIGS. 12A to 12B.

Referring to FIG. 11, when a plurality of images that focus on different sub images are acquired through successive photographing in operation 307 of FIG. 3A, the electronic device may select a representative image to be displayed on the display module 150 from the plurality of successively photographed images in operation 1101. For example, the electronic device may select a first photographed image as a representative image.

Figure 12A:
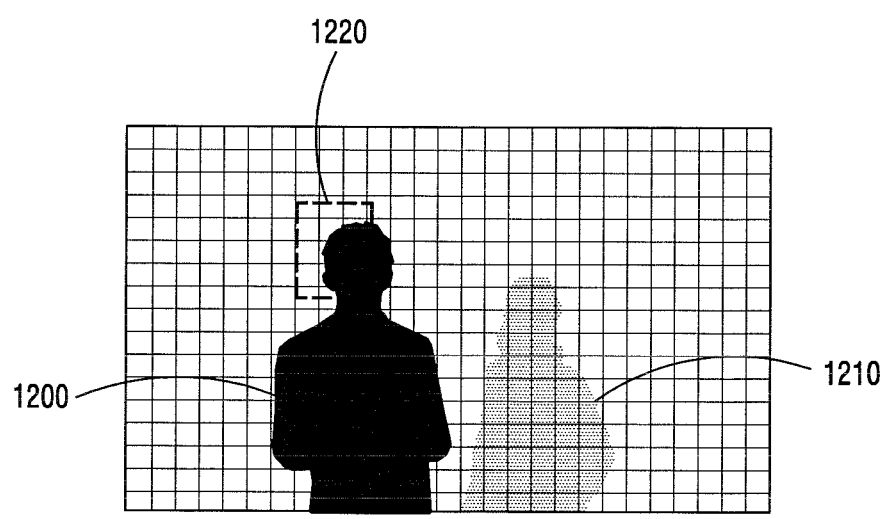
FIGS. 12A to 12B illustrate a configuration for blur-processing an image according to an embodiment of the present disclosure.
Figure 12B:
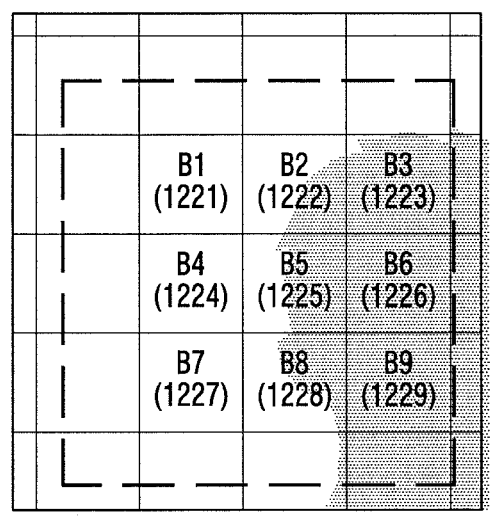

The electronic device may apply an image effect to at least one different sub image except for the sub image that focuses on the representative image in operation 1103. For example, the electronic device may equally perform the blur processing on at least one other sub image except for the sub image that focuses on the representative image. In another example, the electronic device may relatively differently perform the blur processing on sub images based on the relative distance between sub images. In this case, the electronic device may blur-process an image block including overlapping sub images having different relative distances such as a peripheral area of the sub image in a similar way to that of neighboring image blocks. For example, when an image including a first sub image 1200 and a second sub image 1210 is blur-processed as illustrated in FIG. 12A, the electronic device may extract a second image block 1222, a fifth image block 1225, and an eighth image block 1228 including an outline of a first sub image 1200 in an area 1220 in which the first sub image 1200 and a background overlap each other. The electronic device may divide each of the extracted image blocks 1222, 1225, and 1228 into a plurality of areas based on outline information (for example, segmentation information) of the first sub image 1200. The electronic device may perform blur processing on each area similarly to a neighboring image block adjacent to the corresponding area. For example, the electronic device may perform the blur processing on a left area of the fifth image block 1225 similarly to a fourth image block 1224 indicating the background, and perform the blur processing on a right area of the fifth image block 1225 similarly to a sixth image block 1226. When the first sub image 1200 is focused, the electronic device may clearly display the right area of the fifth image block 1225.

The electronic device may display a representative image edited from at least one sub image on the display module 150 to show an image effect in operation 1105.

Various embodiments may include an operation of displaying a third image that focuses on a first sub image among the successively photographed images on the display module.

According to various embodiments, the operation of displaying the third image on the display module may include an operation of blur-processing at least one other sub image in the third image based on a relative distance between the first sub image and at least one other sub image and an operation of displaying the blur-processed third image on the display module.

According to various embodiments, the operation of blur-processing the sub image may include an operation of blur-processing at least one image block including an outline of the first sub image based on blur information of neighboring image blocks.

According to various embodiments, the operation of blur-processing the sub image may include an operation of dividing at least one image block including the outline of the first sub image into at least one area based on the outline of the first sub image and an operation of blur-processing at least one area included in each image block based on blur information of at least one neighboring image block adjacent to each area.

Figure 13:
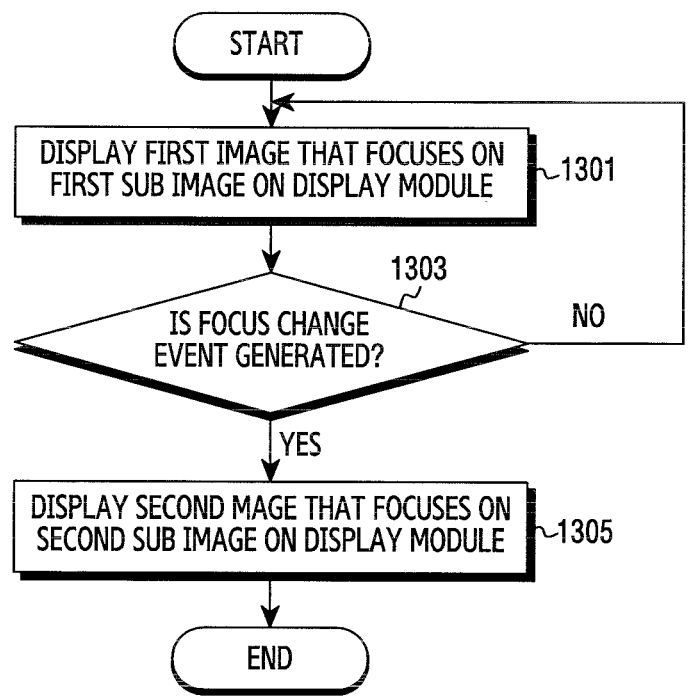
FIG. 13 illustrates a procedure in which the electronic device changes the focus of a photographed image according to an embodiment of the present disclosure.

FIG. 13 illustrates a procedure in which the electronic device changes the focus of a photographed image according to an embodiment of the present disclosure. Hereinafter, features of changing the focus of an image will be described with reference to FIGS. 5B to 5D.

Referring to FIG. 13, the electronic device may display a first image that focuses on a first sub image among a plurality of successively photographed images on the display module 150 in operation 1301. For example, among a plurality of successively photographed images as illustrated in FIGS. 5B to 5D, the electronic device may display a first image 512 that focuses on a first sub image 500 as illustrated in FIG. 5B on the display module 150.

The electronic device may identify whether an event for a focus change is generated in operation 1303. For example, the electronic device may identify whether a touch input of another sub image is detected in the first image displayed on the display module 150. In another example, the electronic device may identify whether a user's gesture input corresponding to the focus change event is detected.

When the focus change event is not generated in operation 1303, the electronic device may maintain displaying the first image in operation 1301.

When the focus change event is generated in operation 1303, the electronic device may display a second image that focuses on a second sub image among the plurality of successively photographed images on the display module 150 in operation 1305. For example, the second image may include an image corresponding to the focus change event among the plurality of images. For example, when the focus change event is generated in a state where the first image 512 as illustrated in FIG. 5B is displayed on the display module 150, the electronic device may change the first image 512 displayed on the display module 150 into the second image 514 that focuses on the second sub image 502 and display the second image 514 as illustrated in FIG. 5C.

Figure 14:
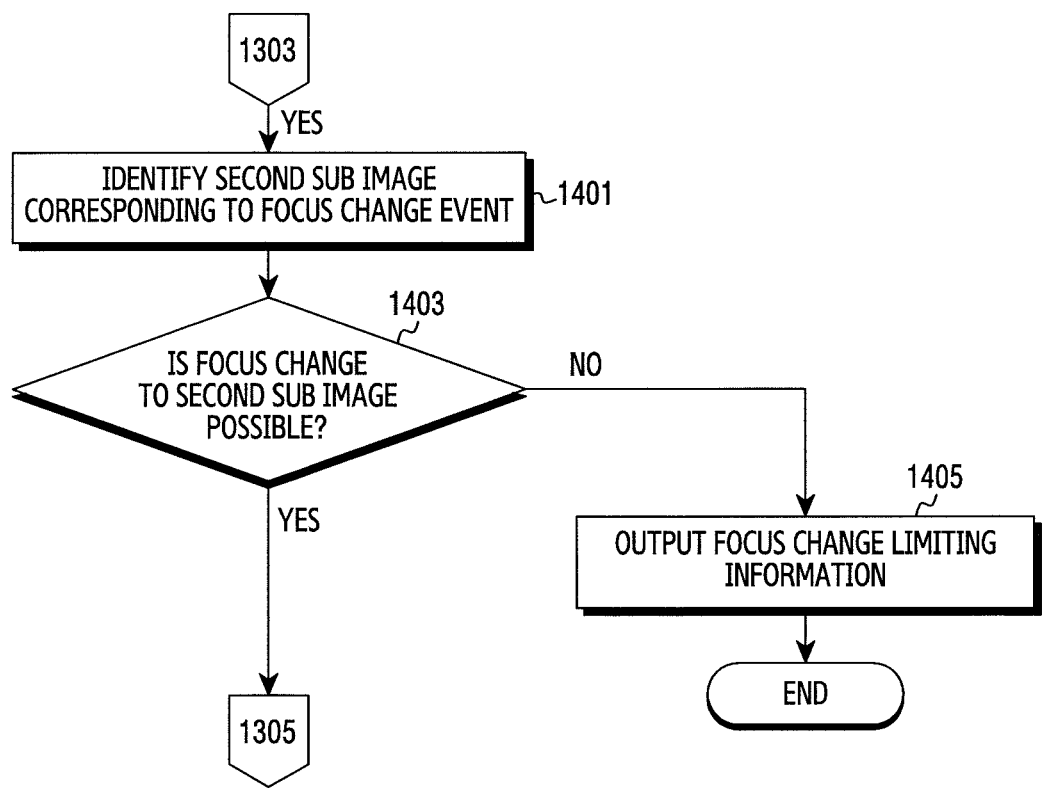
FIG. 14 illustrates a procedure in which the electronic device selects an image corresponding to a focus change event according to an embodiment of the present disclosure.

FIG. 14 illustrates a procedure in which the electronic device selects an image corresponding to a focus change event according to an embodiment of the present disclosure.

Referring to FIG. 14, when a focus change event is generated in operation 1303 of FIG. 13, the electronic device may identify a second sub image corresponding to the focus change event in operation 1401. For example, the electronic device may identify the second sub image including a touched position to generate the focus change event.

The electronic device may identify whether the focus change to the second sub image is possible in operation 1403. For example, the electronic device may identify whether an image that focuses on the second sub image exists in the plurality of successively photographed images. When the image that focuses on the second sub image does not exist, the electronic device may recognize that the focus change to the second sub image is not possible.

When the focus change to the second sub image is not possible in operation 1403, the electronic device may output focus change limiting information in operation 1405. For example, the electronic device may display a focus change limiting message on the display module 150. In another example, the electronic device may add at least one graphic element to the first image displayed on the display module 150 or modify the first image and display focus change limiting information.

When the focus change to the second sub image is possible in operation 1403, the electronic device may display the second image that focuses on the second sub image among the plurality of successively photographed images on the display module 150 in operation 1305 of FIG. 13.

Various embodiments may include, when selection of the second sub image is detected in a third image displayed on the display module among the successively photographed images, an operation of displaying a fourth image that focuses on the second sub image among the successively photographed images on the display module.

Figure 15:
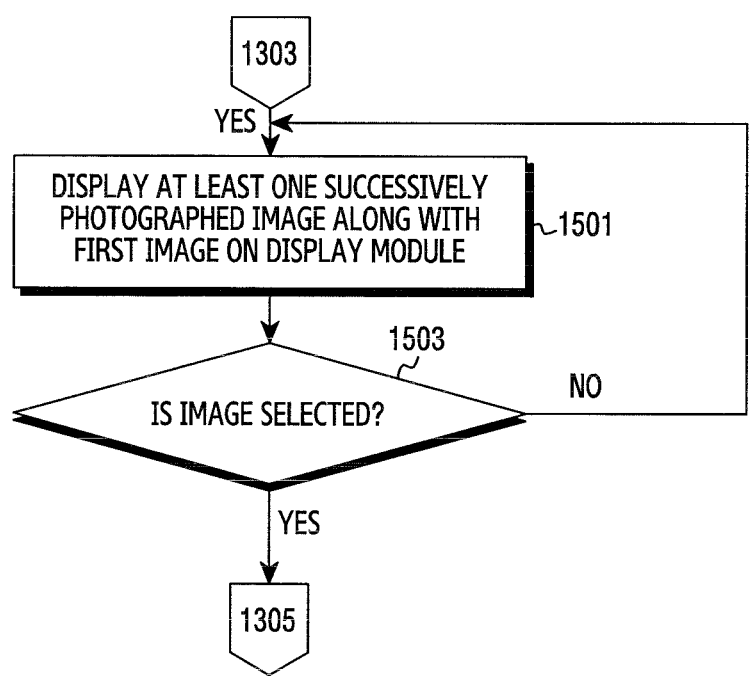
FIG. 15 illustrates a procedure in which the electronic device selects an image based on input information according to an embodiment of the present disclosure.

FIG. 15 illustrates a procedure in which the electronic device selects an image based on input information according to an embodiment of the present disclosure.

Referring to FIG. 15, when the focus change event is generated in operation 1303 of FIG. 13, the electronic device may display at least one successively photographed other image on the display module 150 along with the first image in operation 1501. For example, when the first image 512 that focuses on the first sub image 500 among the plurality of successively photographed images as illustrated in FIGS. 5B to 5D is displayed on the display module 150, the electronic device may display information on the second image 514 that focuses on the second sub image 502 and the third image 516 that focuses on the background on the display module 150.

The electronic device may identify whether image selection is detected in operation 1503. For example, the electronic device may identify whether selection of one image from at least one image displayed on the display module 150 is detected based on input information provided through the input module 140.

When the image selection is not detected in operation 1503, the electronic device may display at least one successively photographed image on the display module 150 along with the first image in operation 1501.

When selection of a second image that focuses on a second sub image is detected in operation 1503, the electronic device may display the second image that focuses on the second sub image of which the selection is detected on the display module 150 in operation 1305 of FIG. 13.

Various embodiments may include, when a third image of the successively photographed images is displayed on the display module, an operation of identifying whether a focus change event is generated, when the event is generated, an operation of displaying information on the successively photographed images on the display module and, when selection of a fifth image of at least one second image displayed on the display module is detected, an operation of displaying the fifth image on the display module.

Figure 16:
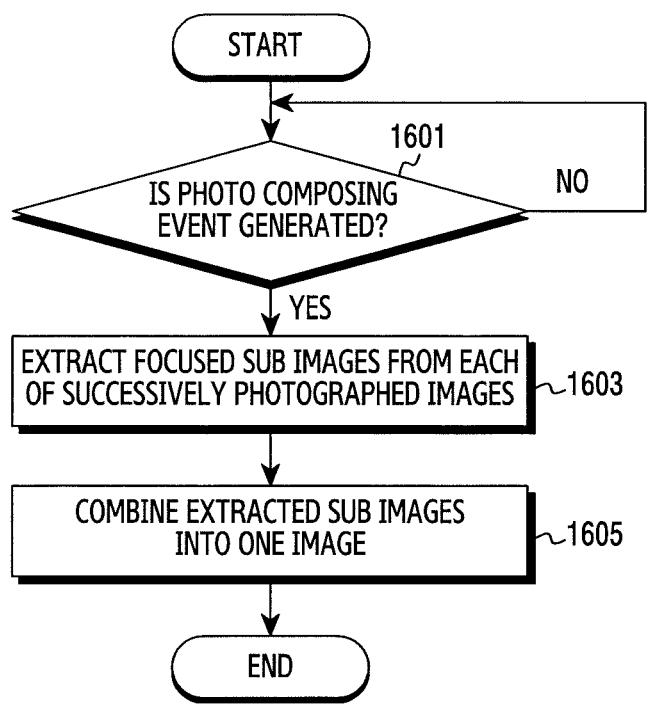
FIG. 16 illustrates a procedure in which the electronic device combines images including different pieces of focus information according to an embodiment of the present disclosure.

FIG. 16 illustrates a procedure in which the electronic device combines images including different pieces of focus information according to an embodiment of the present disclosure. Hereinafter, features for combining images will be described with reference to FIGS. 5B to 5D.

Referring to FIG. 16, the electronic device may identify whether a photo composing event is generated in operation 1601. For example, the electronic device may identify whether the photo composing event is generated based on input information detected through the input module 140. In another example, the electronic device may identify whether a user gesture corresponding to the photo composing event is detected.

When the photo composing event is not generated in operation 1601, the electronic device may identify again whether the photo composing event is generated in operation 1601.

When the photo composing event is generated in operation 1601, the electronic device may extract at least one focused sub image from each of successively photographed images in operation 1603. For example, the electronic device may extract the focused first sub image 500 from the first image 512 of FIG. 5B, extract the focused second sub image 502 from the second image 514 of FIG. 5C, and extract the focused background image from the third image 516.

The electronic device may combine the extracted sub images into one image in operation 1605.

Figure 17:
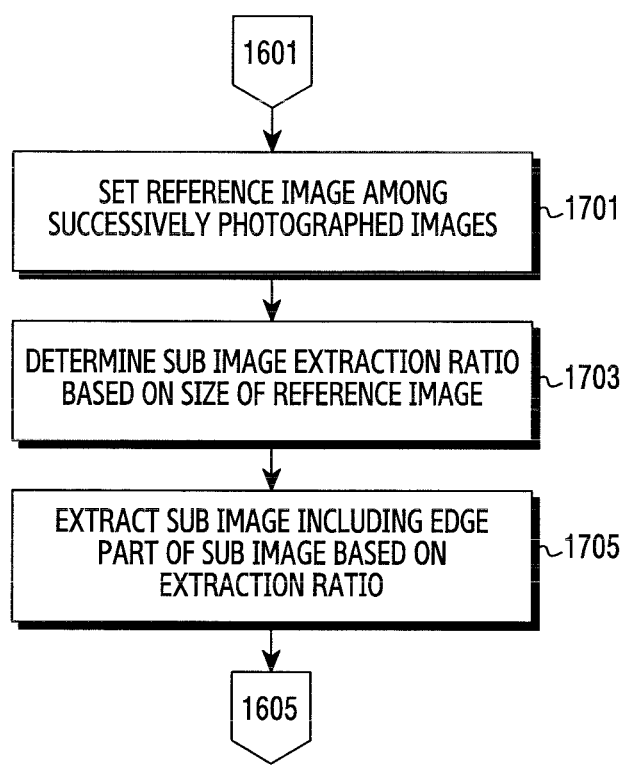
FIG. 17 illustrates a procedure in which the electronic device extracts sub images to be combined according to an embodiment of the present disclosure.

FIG. 17 illustrates a procedure in which the electronic device extracts sub images to be combined according to an embodiment of the present disclosure. Hereinafter, features for combining images will be described with reference to FIGS. 18A to 18D.

Referring to FIG. 17, when the photo composing event is generated in operation 1601 of FIG. 16, the electronic device may set a reference image among the successively photographed images in operation 1701. For example, when successive photographing is performed, the electronic device may generate a view angle difference of each image according to lens movement. Accordingly, the electronic device may set an image, which is most enlarged or reduced, among the successively photographed images as the reference image.

The electronic device may determine an extraction ratio for extracting a sub image from another image based on a size of the sub image included in the reference image in operation 1703. For example, the electronic device may determine a ratio for extracting the focused sub image from each image by comparing sizes of the images.

Figure 18A:
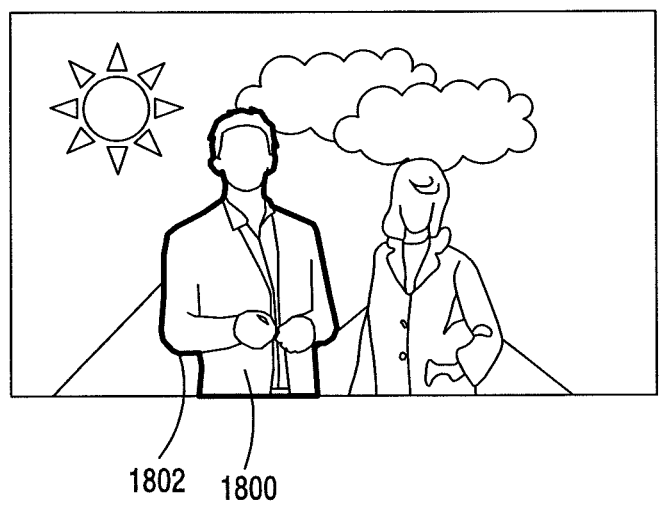
FIGS. 18A to 18D illustrate a configuration for combining images including different pieces of focus information by the electronic device according to an embodiment of the present disclosure.
Figure 18B:

The electronic device may extract the corresponding sub image including an edge part spaced apart from the outline of the focused sub image by a reference interval in each image based on the extraction ratio in operation 1705. For example, when the first image that focuses on the first sub image 500 is set as the reference image as illustrated in FIG. 5B, the electronic device may extract a first sub image 1800 based on an outline 1802 of the first sub image 1800 as illustrated in FIG. 18A. The electronic device may extract a second sub image 1810 to include an edge 1812 spaced apart from the outline of the second sub image 1810 by a reference interval based on an extraction ratio of the second sub image 1810 as illustrated in FIG. 18B. The electronic device may extract a third sub image 1820 to include an edge 1822 spaced apart from the outline of the third sub image 1820 by a reference interval based on an extraction ratio of the third sub image 1820 as illustrated in FIG. 18C.

Figure 18C:
Figure 18D:

When the sub images 1800, 1810, and 1820 are extracted as illustrated in FIGS. 18A to 18C in operation 1705, the electronic device may generate one image that focuses on the entire area by combining the extracted images as illustrated in FIG. 18D in operation 1605 of FIG. 16.

Figure 19:
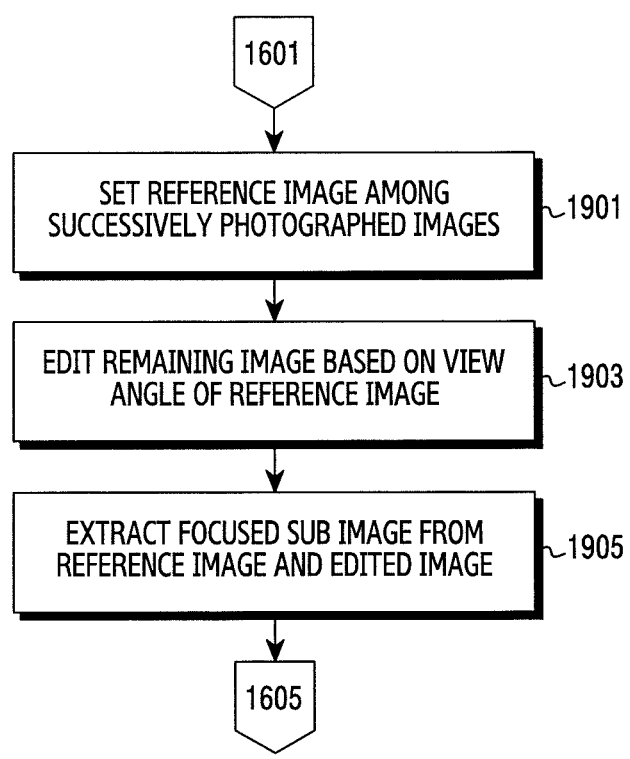
FIG. 19 illustrates a procedure for extracting sub images to be combined by the electronic device according to another embodiment of the present disclosure.

FIG. 19 illustrates a procedure in which the electronic device extracts sub images to be combined according to another embodiment of the present disclosure. Hereinafter, features for combining images will be described with reference to FIGS. 20A to 20C.

Referring to FIG. 19, when the photo composing event is generated in operation 1601 of FIG. 16, the electronic device may set a reference image among the successively photographed images in operation 1901. For example, when successive photographing is performed, the electronic device may generate a view angle difference of each image according to lens movement. Accordingly, the electronic device may set an image, which is most enlarged or reduced, among the successively photographed images as the reference image.

Figure 20A:
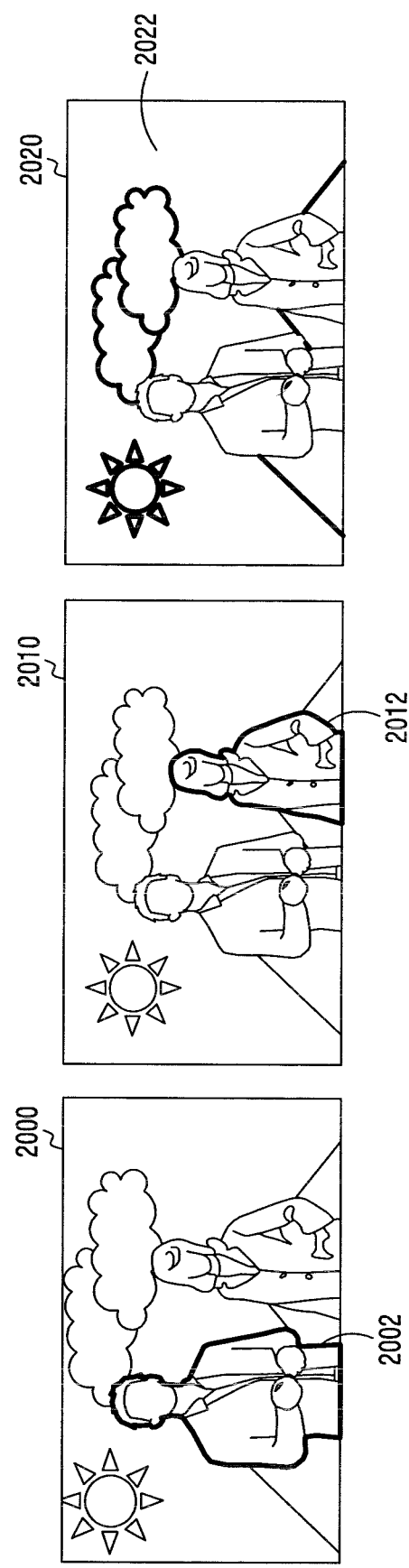
FIGS. 20A to 20C illustrate a configuration for combining images including different pieces of focus information by the electronic device according to another embodiment of the present disclosure.
Figure 20B:
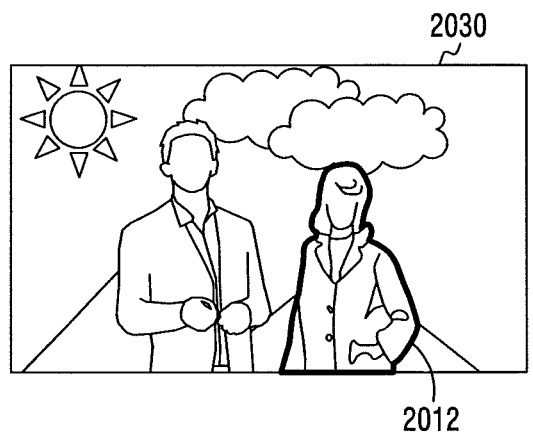
Figure 20C:
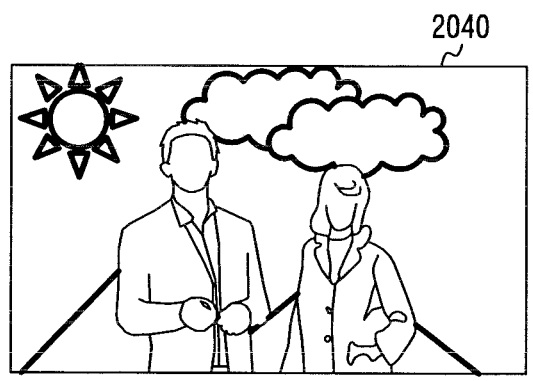

The electronic device may edit at least one successively photographed remaining image based on the view angle of the reference image in operation 1903. For example, when a first image 1900 most enlarged among the successively photographed images 2000, 2010, and 2020 illustrated in FIG. 20A is set as a reference image, the electronic device may crop at least some areas of the edge of the second image 2010 illustrated in FIG. 20B based on the first image 2000 to make view angles of the successively photographed images 2000, 2010, and 2020 the same to each other as indicated by reference numeral 2030. The electronic device may cut at least some areas of the edge of the third image 2020 illustrated in FIG. 20C based on the first image 2000 to make the view angles of the successively photographed images 2000, 2010, and 2020 the same to each other as indicated by reference numeral 2040. Additionally, the electronic device may enlarge at least one remaining image that has been crop based on the reference image. In another example, when the image most enlarged among the successively photographed images is set as the reference image, the electronic device may enlarge at least one remaining image based on the reference image to make the view angles of the successively photographed images the same.

The electronic device may extract a focused sub image from the reference image and at least one remaining edited image in operation 1905.

When sub images are extracted in operation 1905, the electronic device may generate one image that focuses on the entire area by combining the images extracted in operation 1605 of FIG. 16.

Various embodiments may include an operation of extracting focused sub images from each of the successively photographed images, an operation of combining the extracted sub images into one image, and an operation of displaying the combined image on the display module.

According to various embodiments, the operation of extracting the sub images may include an operation of determining an extraction ratio of at least one remaining sub image based on a size of one of the at least one sub image and an operation of extracting each sub image to include an edge part spaced apart from an outline of at least one remaining sub image by a predetermined interval based on the extraction ratio.

According to various embodiments, the operation of extracting the sub images may include an operation of editing at least one remaining image based on a view angel of one reference image among the successively photographed images and an operation of extracting a focused sub image from the reference image and at least one remaining edited image.

According to various embodiments, the operation of editing the image may include an operation of cropping at least some areas of the edge of at least one remaining image based on a view angle of one reference image among the successively photographed images.

Figure 21:
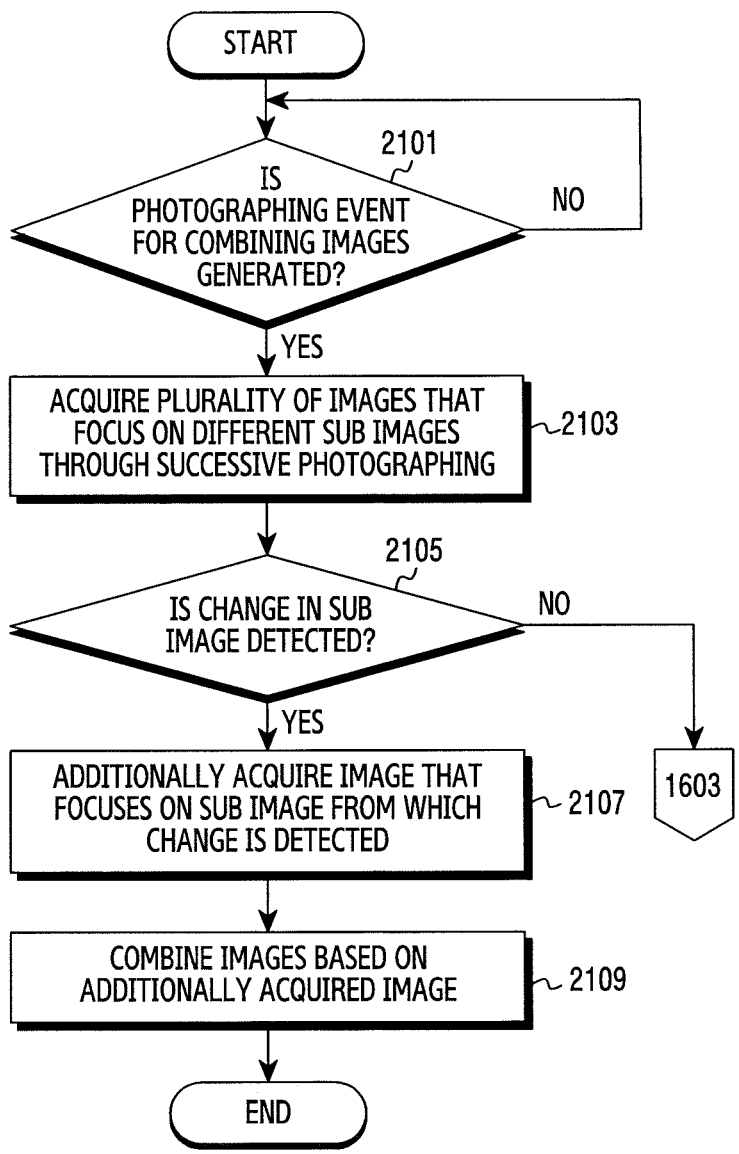
FIG. 21 illustrates a procedure for combining images including different pieces of focus information by the electronic device according to another embodiment of the present disclosure.

FIG. 21 illustrates a procedure in which the electronic device combines images including different pieces of focus information according to another embodiment of the present disclosure. Hereinafter, features for combining images will be described with reference to FIGS. 22A to 22B.

Referring to FIG. 21, the electronic device may identify whether a photographing event for combining the images is generated in operation 2101. For example, the electronic device may identify whether the photographing event for combining the images is generated based on input information detected through the input module 140. In another example, the electronic device may identify whether a user gesture corresponding to the photographing event for combining the images is detected.

When the photographing event for combining the images is not generated in operation 2101, the electronic device may identify again whether the photographing event for combining the images is generated in operation 2101.

Figure 22A:
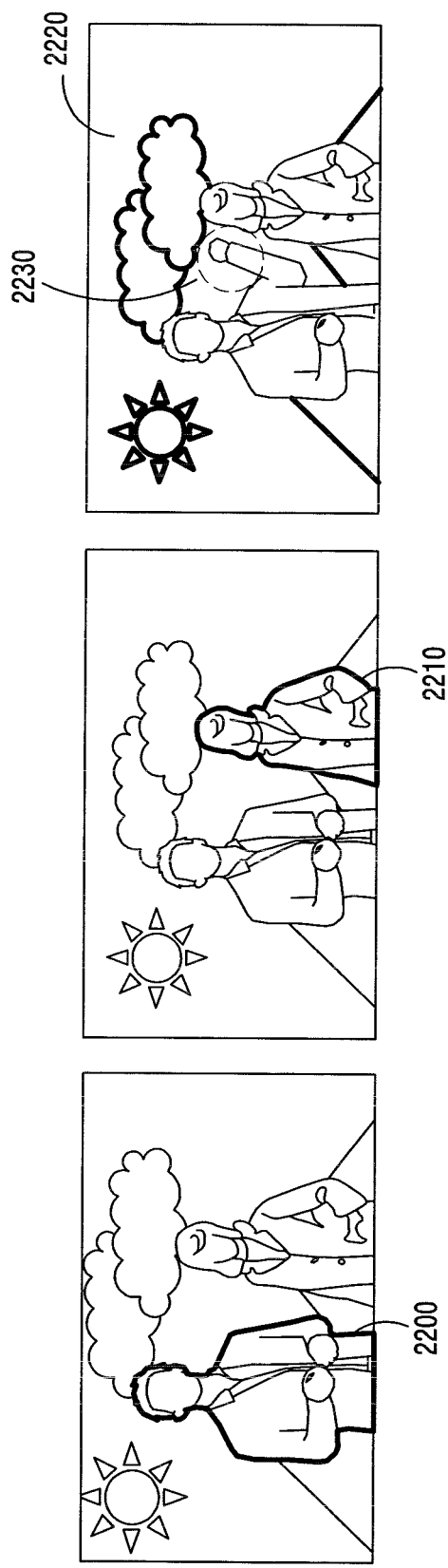
FIGS. 22A to 22B illustrate a configuration for photographing images to be combined according to an embodiment of the present disclosure.

When the photographing event for combining the images is generated in operation 2101, the electronic device may successively photograph images that focus on different sub images in operation 2103. For example, the electronic device may successively photograph a first image that focuses on a first sub image 2200, a second image that focuses on a second sub image 2210, and a third image that focuses on a third sub image 2220 as through the procedure of FIG. 3A or 3B as illustrated in FIG. 22A.

The electronic device may identify whether a change in the sub image is detected in operation 2105. For example, the electronic device may identify whether the change in the sub image is detected by comparing images acquired through successive photographing. For example, the electronic device may detect a change 2230 in the first sub image 2200 by comparing the first image and the third image of FIG. 22A.

When the change in the sub image is not detected in operation 2105, the electronic device may extract at least one sub image that focuses on each of the successively photographed images in operation 1603 of FIG. 16.

Figure 22B:
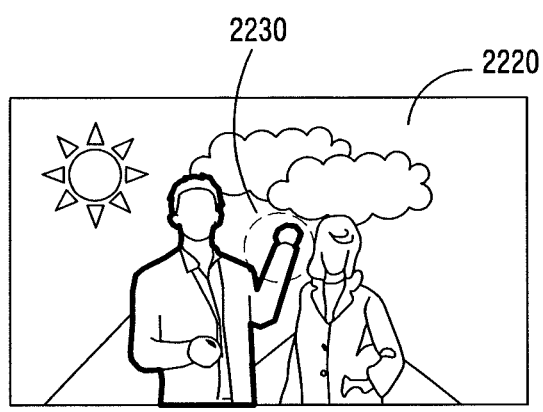

When the change in the sub image is detected in operation 2105, the electronic device may additionally acquire an image that focuses on the sub image from which the change is detected in operation 2107. For example, when the change 2230 in the first sub image 2200 is detected, the electronic device may additionally acquire an image that focuses on the first sub image 2200 through additional photographing as illustrated in FIG. 22B.

The electronic device may combine images based on the additionally acquired image in operation 2109. For example, the electronic device may extract sub images from the second image and the third image of FIG. 22A and the additional image of FIG. 22B and combine the extracted sub images into one image.

According to various embodiments of the present disclosure, the electronic device may acquire a plurality of images that focus on sub images based on a relative distance between the sub images detected using phase difference pixels, thereby changing the focus of a subject after image photographing and reducing a time to acquire a plurality of images.

According to various embodiments of the present disclosure, the electronic device may control a number of times sub images including the same depth of focus are photographed based on depths of focus of sub images, thereby limiting repeated photographing of the sub images including the same depth of focus.

According to various embodiments of the present disclosure, the electronic device may edit each sub image based on a relative distance between sub images detected using phase difference pixels, thereby providing various image effects such as an out-focusing effect with respect to the photographed image.

According to various embodiments of the present disclosure, the electronic device may combine at least one sub image included in a plurality of images having different focal distances, thereby providing an image that focuses on all subjects.

Meanwhile, although concrete embodiments have been described in the detailed description of the present disclosure, operation sequences of the electronic device may be changed, combined, or re-used and may be variously modified such as omission without departing from the scope of the present disclosure. Therefore, the scope of the present disclosure should not be defined as being limited to the embodiments, but should be defined by the appended claims and equivalents thereof.

The invention claimed is:

1. A method of processing an image by an electronic device, the method comprising:
   acquiring a first image by using at least one image sensor including an array of pixels including a plurality of phase difference pixels;
   detecting a plurality of objects in the first image;
   estimating a relative distance between each of the plurality of objects by using phase difference information acquired using the plurality of phase difference pixels;
   capturing a plurality of second images by focusing on each of the plurality of objects by using the relative distance between each of the plurality of objects;
   storing the captured plurality of second images;
   acquiring a first user selection from a user that selects a first object of the plurality of objects;
   determining a second image of the plurality of second images that is focused on the first object selected by the user;
   setting the second image as a reference image;
   determining a third image of the plurality of second images that is focused on a second object of the plurality of objects; and
   adjusting a size of the second object in the third image based on a size of the second object in the reference image.

2. The method of claim 1, wherein the acquiring of the first image comprises acquiring the first image including a plurality of color pixels and the phase difference information by using the at least one image sensor.

3. The method of claim 1, wherein the detecting of the plurality of objects comprises:
   dividing the first image into a plurality of image blocks;
   detecting phase difference information of each of the plurality of image blocks; and
   detecting the plurality of objects based on the phase difference information of each of the plurality of image blocks.

4. The method of claim 3, wherein the detecting of the plurality of objects comprises:
   grouping at least one image block having the phase difference information included within a reference range; and
   detecting the plurality of objects based on a number of grouped image blocks.

5. The method of claim 3, further comprising:
   when the plurality of objects are detected, detecting a depth of focus of each of the plurality of objects from the first image; and
   extracting the plurality of objects of the first image based on the depth of focus of each of the plurality of objects of the first image.

6. The method of claim 1, further comprising displaying the third image focusing on the first second object of the plurality of second images on a display of the electronic device.

7. The method of claim 6, further comprising, when a selection input of the second object is detected in the third image displayed on the display, displaying a fourth image focusing on the second object of the plurality of second images on the display.

8. The method of claim 6, further comprising:
   identifying whether a focus change event has occurred;
   when the focus change event has occurred, displaying information on the plurality of second images on the display; and
   when a selection input of a fifth image of the plurality of second images displayed on the display is detected, displaying the fifth image on the display.

9. The method of claim 6, wherein the displaying of the third image comprises:
   blur processing at least one other object in the third image based on a relative distance between the first object and the at least one other object; and
   displaying the blur processing of the at least one other object in the third image.

10. The method of claim 1, further comprising:
    acquiring a second user selection from the user that selects the second object; and
    when an image of the plurality of second images, which focuses on the second object, does not exist, recognizing that a focus change event is not possible.

11. The method of claim 1, further comprising:
    extracting the second object from the third image,
    wherein the adjusting the size of the second object in the third image is based on a ratio of the size of the second object in the third image and a size of the second object in the reference image.

12. The method of claim 11, further comprising:
    adding the size adjusted second object from the third image to the reference image.

13. The method of claim 11, further comprising:
    adding the first object of the reference image and the size adjusted second object from the third image together in another image.

14. An electronic device comprising:
    at least one image sensor including an array of pixels including a plurality of phase difference pixels; and
    at least one processor configured to:
      detect a plurality of objects in a first image acquired using the at least one image sensor,
      estimate a relative distance between the plurality of objects by using at least one piece of phase difference information acquired using the plurality of phase difference pixels,
      capture a plurality of second images by focusing on each of the plurality of objects by using the relative distance between the plurality of objects,
      store the plurality of second images,
      acquire a user selection from a user that selects a first object of the plurality of objects, wherein the plurality of objects each has a different distance from the electronic device,
      determine a second image of the plurality of second images that is focused on the first object selected by the user, setting the second image as a reference image, determine a third image of the plurality of second images that is focused on a second object of the plurality of objects, and adjust a size of the second object in the third image based on a size of the second object in the reference image.

15. The electronic device of claim 14, wherein the at least one processor is further configured to detect the plurality of objects in the first image including a plurality of color pixels and the phase difference information acquired using the at least one image sensor.

16. The electronic device of claim 14, wherein the at least one processor is further configured to:

divide the first image into a plurality of image blocks, detect phase difference information of each of the plurality of image blocks, and detect the plurality of objects based on the phase difference information of each of the plurality of image blocks.

17. The electronic device of claim 16, wherein the at least one processor is further configured to group at least one image block having the phase difference information included within a reference range and detect the plurality of objects based on a number of grouped image blocks.

18. The electronic device of claim 16, wherein the at least one processor is further configured to:

detect the plurality of objects from the first image based on the phase difference information, and detect a depth of focus of each object of the first image and extract the plurality of objects based on the depth of focus of each of the plurality of objects in the first image.

19. The electronic device of claim 14, further comprising a display configured to display the third image focusing on the second object of the plurality of second images.

20. The electronic device of claim 19, further comprising an input device, wherein the display is further configured to display, when a selection input of the second object is detected in the third image through the input device, a fourth image focusing on the second object of the plurality of second images.

21. The electronic device of claim 19, further comprising an input device, wherein the display is further configured to:

display information on the plurality of second images when a focus change event has occurred, and display a fifth image when a selection of the fifth image of the plurality of second images is detected through the input device.

22. The electronic device of claim 19, wherein, based on a relative distance between the first object and at least one other object, the at least one processor is further configured to blur-process the at least one other object in the third image.

23. An electronic device comprising:

an input device configured to detect a user input;

an image acquisition device configured to acquire a first image;

a memory configured to store the first image; and at least one processor configured to:

acquire phase difference information of a plurality of objects included in the first image, capture a plurality of second images through the image acquisition device by focusing on each of the plurality of objects based on the phase difference information of the plurality of objects, in response to a user input for capturing the first image by the image acquisition device being detected through the input device, and estimate a relative distance between each of the plurality of objects included in the image based on the phase difference information, wherein at least two images of the plurality of second images have different focal distances and the different focal distances are set at least partially based on the estimated relative distance between each of the plurality of objects included in the first image, and wherein the at least one processor is further configured to:

store the plurality of second images, acquire a user selection from a user that selects a first object of the plurality of objects, wherein the plurality of objects each has a different distance from the electronic device, determine a second image of the plurality of second images that is focused on the first object selected by the user, setting the second image as a reference image, determine a third image of the plurality of second images that is focused on a second object of the plurality of objects, and adjust a size of the second object in the third image based on a size of the second object in the reference image.

24. The electronic device of claim 23, wherein the at least one processor is further configured to acquire the phase difference information using a plurality of phase difference pixels included in the image acquisition device.

* * * * *